(12) United States Patent
Khoshnevisan et al.

(10) Patent No.: US 12,004,176 B2
(45) Date of Patent: Jun. 4, 2024

(54) OVERLAPPING PHYSICAL DOWNLINK CONTROL CHANNEL CANDIDATE THRESHOLDS

(71) Applicant: QUALCOMM Incorporated, San Diego, CA (US)

(72) Inventors: Mostafa Khoshnevisan, San Diego, CA (US); Jae Ho Ryu, San Diego, CA (US); Hari Sankar, San Diego, CA (US); Hobin Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/387,842

(22) Filed: Jul. 28, 2021

(65) Prior Publication Data
US 2023/0033461 A1    Feb. 2, 2023

(51) Int. Cl.
*H04W 72/23*    (2023.01)
*H04L 5/00*    (2006.01)
*H04L 27/26*    (2006.01)

(52) U.S. Cl.
CPC ........... *H04W 72/23* (2023.01); *H04L 5/0053* (2013.01); *H04L 27/26025* (2021.01)

(58) Field of Classification Search
CPC . H04W 72/23; H04L 5/0053; H04L 27/26025
See application file for complete search history.

(56) References Cited

U.S. PATENT DOCUMENTS

| | | |
|---|---|---|
| 11,051,292 B2 | 6/2021 | Hosseini et al. |
| 2019/0215098 A1* | 7/2019 | Tiirola ................. H04W 24/08 |
| 2020/0145984 A1 | 5/2020 | Hosseini et al. |
| 2021/0195559 A1 | 6/2021 | Khoshnevisan et al. |
| 2021/0360610 A1* | 11/2021 | Kim ..................... H04L 5/0094 |
| 2022/0217694 A1 | 7/2022 | Kim et al. |
| 2022/0240111 A1 | 7/2022 | Jang et al. |

OTHER PUBLICATIONS

International Search Report and Written Opinion—PCT/US2022/037023—ISA/EPO—dated Oct. 17, 2022.

* cited by examiner

*Primary Examiner* — Charles C Jiang
*Assistant Examiner* — Debebe A Asefa
(74) *Attorney, Agent, or Firm* — Harrity & Harrity, LLP

(57) ABSTRACT

Methods, systems, and devices for wireless communications are described that support overlapping physical downlink control channel (PDCCH) candidate thresholds. In some examples, a user equipment (UE) may determine, for each subcarrier spacing (SCS) configuration of a set of SCS configurations, a threshold number of overlapping PDCCH candidates within a time interval. The UE may receive, from a base station, signaling indicating one or more PDCCH monitoring configurations. In some examples, the UE may monitor the PDCCH for control information according to the one or more PDCCH monitoring configurations and a number of overlapping PDCCH candidates, where the number of overlapping PDCCH candidates may satisfy (e.g., be less than or equal to) the threshold number of overlapping PDCCH candidates.

40 Claims, 12 Drawing Sheets

OVERLAPPING PHYSICAL DOWNLINK CONTROL CHANNEL CANDIDATE THRESHOLDS

FIELD OF TECHNOLOGY

The following relates to wireless communications, including overlapping physical downlink control channel (PDCCH) candidate thresholds.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). A base station may transmit control information to a UE over a PDCCH, and the UE may be operable to monitor one or more PDCCH candidates for such control information in accordance with PDCCH monitoring configurations.

SUMMARY

The described techniques relate to improved methods, systems, devices, and apparatuses that support overlapping physical downlink control channel (PDCCH) candidate thresholds. Generally, the described techniques provide for a threshold number of overlapping PDCCH candidates. Specifically, the threshold may be defined in the time domain, the frequency domain, per subcarrier spacing (SCS), and for different PDCCH candidate overlapping scenarios. The threshold number of overlapping PDCCH candidates may be predefined or may be indicated to a base station, for example, via capability signaling from the UE. In some examples, the UE may determine the threshold number of overlapping PDCCH candidates for each SCS, and the UE may receive signaling that indicates one or more PDCCH monitoring configurations. The UE may accordingly monitor PDCCH for control information based on the one or more PDCCH monitoring configurations and a number of overlapping PDCCH candidates, where the number of overlapping PDCCH candidates is less than or equal to the threshold number of overlapping PDCCH candidates. When calculating (e.g., counting) the number of PDCCH candidates towards the threshold (e.g., based on the one or more PDCCH monitoring configurations), the UE may determine a total number of overlapping PDCCH candidates and subtract some quantity (e.g., one) from the total number of overlapping PDCCH candidates. Additionally or alternatively, the number of PDCCH candidates may be counted based on a number of overlapping PDCCH candidate pairs. In any case, the threshold number of overlapping PDCCH candidates may support relatively reduced complexity at the UE by limiting a number of overlapping PDCCH candidates the UE identifies for PDCCH monitoring.

A method for wireless communication at a UE is described. The method may include determining, for each SCS configuration of a set of one or more SCS configurations, a threshold number of overlapping PDCCH candidates within a time interval, receiving signaling indicating one or more PDCCH monitoring configurations, and monitoring a PDCCH for control information based on the one or more PDCCH monitoring configurations and a number of overlapping PDCCH candidates satisfying the threshold number of overlapping PDCCH candidates.

An apparatus for wireless communication at a UE is described. The apparatus may include a processor, memory coupled with the processor, and instructions stored in the memory. The instructions may be executable by the processor to cause the apparatus to determine, for each SCS configuration of a set of one or more SCS configurations, a threshold number of overlapping PDCCH candidates within a time interval, receive signaling indicating one or more PDCCH monitoring configurations, and monitor a PDCCH for control information based on the one or more PDCCH monitoring configurations and a number of overlapping PDCCH candidates satisfying the threshold number of overlapping PDCCH candidates.

Another apparatus for wireless communication at a UE is described. The apparatus may include means for determining, for each SCS configuration of a set of one or more SCS configurations, a threshold number of overlapping PDCCH candidates within a time interval, means for receiving signaling indicating one or more PDCCH monitoring configurations, and means for monitoring a PDCCH for control information based on the one or more PDCCH monitoring configurations and a number of overlapping PDCCH candidates satisfying the threshold number of overlapping PDCCH candidates.

A non-transitory computer-readable medium storing code for wireless communication at a UE is described. The code may include instructions executable by a processor to determine, for each SCS configuration of a set of one or more SCS configurations, a threshold number of overlapping PDCCH candidates within a time interval, receive signaling indicating one or more PDCCH monitoring configurations, and monitor a PDCCH for control information based on the one or more PDCCH monitoring configurations and a number of overlapping PDCCH candidates satisfying the threshold number of overlapping PDCCH candidates.

Some examples of the method, apparatuses, and non-transitory computer-readable medium described herein may further include operations, features, means, or instructions for calculating the number of overlapping PDCCH candidates based on the one or more PDCCH monitoring configurations, where the number of overlapping PDCCH candidates may be less than or equal to the threshold number of overlapping PDCCH candidates.

In some examples of the method, apparatuses, and non-transitory computer-readable medium described herein, calculating the number of overlapping PDCCH candidates may include operations, features, means, or instructions for determining a total number of overlapping control channel candidates within the time interval and subtracting a quantity from the total number of overlapping control channel candidates, where the number of overlapping PDCCH candidates may be determined based on a result of the subtracting.

In some examples of the method, apparatuses, and non-transitory computer-readable medium described herein, calculating the number of overlapping PDCCH candidates may include operations, features, means, or instructions for determining a number of overlapping PDCCH candidate pairs and calculating the number of overlapping PDCCH candidates based on the number of overlapping PDCCH candidate pairs.

In some examples of the method, apparatuses, and non-transitory computer-readable medium described herein, determining the threshold number of overlapping PDCCH candidates may include operations, features, means, or instructions for identifying the threshold number of overlapping PDCCH candidates from a set of predetermined PDCCH candidate thresholds.

Some examples of the method, apparatuses, and non-transitory computer-readable medium described herein may further include operations, features, means, or instructions for identifying the threshold number of overlapping PDCCH candidates from the set of predetermined PDCCH candidate thresholds may be based on a SCS, the one or more PDCCH monitoring configurations, or any combination thereof.

Some examples of the method, apparatuses, and non-transitory computer-readable medium described herein may further include operations, features, means, or instructions for transmitting capability signaling including an indication of the threshold number of overlapping PDCCH candidates.

In some examples of the method, apparatuses, and non-transitory computer-readable medium described herein, the capability signaling may be indicated per radio frequency band, per radio frequency band combination, or any combination thereof.

In some examples of the method, apparatuses, and non-transitory computer-readable medium described herein, the capability signaling includes the indication of the threshold number of overlapping PDCCH candidates per SCS configuration, per downlink control channel monitoring configurations, or any combination thereof.

In some examples of the method, apparatuses, and non-transitory computer-readable medium described herein, the capability signaling includes the indication of the threshold number of overlapping PDCCH candidates per slot, per span, or any combination thereof.

In some examples of the method, apparatuses, and non-transitory computer-readable medium described herein, the capability signaling indicates that the UE supports PDCCH repetition.

Some examples of the method, apparatuses, and non-transitory computer-readable medium described herein may further include operations, features, means, or instructions for calculating the number of overlapping PDCCH candidates for respective component carriers (CCs) of a set of one or more CCs, for the set of one or more CCs, or any combination thereof, where the threshold number of overlapping PDCCH candidates may be for the respective CCs of the set of one or more CCs, for the set of one or more CCs, or any combination thereof.

In some examples of the method, apparatuses, and non-transitory computer-readable medium described herein, at least one CC of the set of one or more CCs includes a scheduling CC, and the threshold number of overlapping PDCCH candidates associated with the scheduling CC corresponds to a set of multiple CCs scheduled by the scheduling CC.

In some examples of the method, apparatuses, and non-transitory computer-readable medium described herein, determining the threshold number of overlapping PDCCH candidates may include operations, features, means, or instructions for determining a first threshold number of overlapping PDCCH candidates for a first SCS configuration of the set of one or more SCS configurations and determining a second threshold number of overlapping PDCCH candidates for a second SCS configuration of the set of one or more SCS configurations, where the first threshold number of overlapping PDCCH candidates may be different from the second threshold number of overlapping PDCCH candidates.

Some examples of the method, apparatuses, and non-transitory computer-readable medium described herein may further include operations, features, means, or instructions for determining that a first PDCCH candidate overlaps with a second PDCCH candidate based on the one or more PDCCH monitoring configurations, where the threshold number of overlapping PDCCH candidates may be used for the first PDCCH candidate and the second PDCCH candidate.

In some examples of the method, apparatuses, and non-transitory computer-readable medium described herein, the first PDCCH candidate and the second PDCCH candidate each include a non-linked PDCCH candidate.

In some examples of the method, apparatuses, and non-transitory computer-readable medium described herein, the first PDCCH candidate includes a non-linked PDCCH candidate and the second PDCCH candidate includes a PDCCH candidate linked to a third PDCCH candidate different than the first PDCCH candidate and the second PDCCH candidate.

In some examples of the method, apparatuses, and non-transitory computer-readable medium described herein, the first PDCCH candidate includes a PDCCH candidate linked to a third PDCCH candidate and the second PDCCH candidate includes a PDCCH candidate linked to a fourth PDCCH candidate.

In some examples of the method, apparatuses, and non-transitory computer-readable medium described herein, at least one overlapping PDCCH candidate includes a PDCCH candidate that may be excluded from a blind decoding limit.

In some examples of the method, apparatuses, and non-transitory computer-readable medium described herein, each overlapping PDCCH candidate may be associated with a same set of time frequency resources, a same control resource set (CORESET), a same scrambling sequence, a same downlink control information (DCI) size, and a same carrier indicator field (CIF).

In some examples of the method, apparatuses, and non-transitory computer-readable medium described herein, the time interval includes a slot, a span, or a PDCCH monitoring occasion, or any combination thereof.

DETAILED DESCRIPTION

Figure 1:
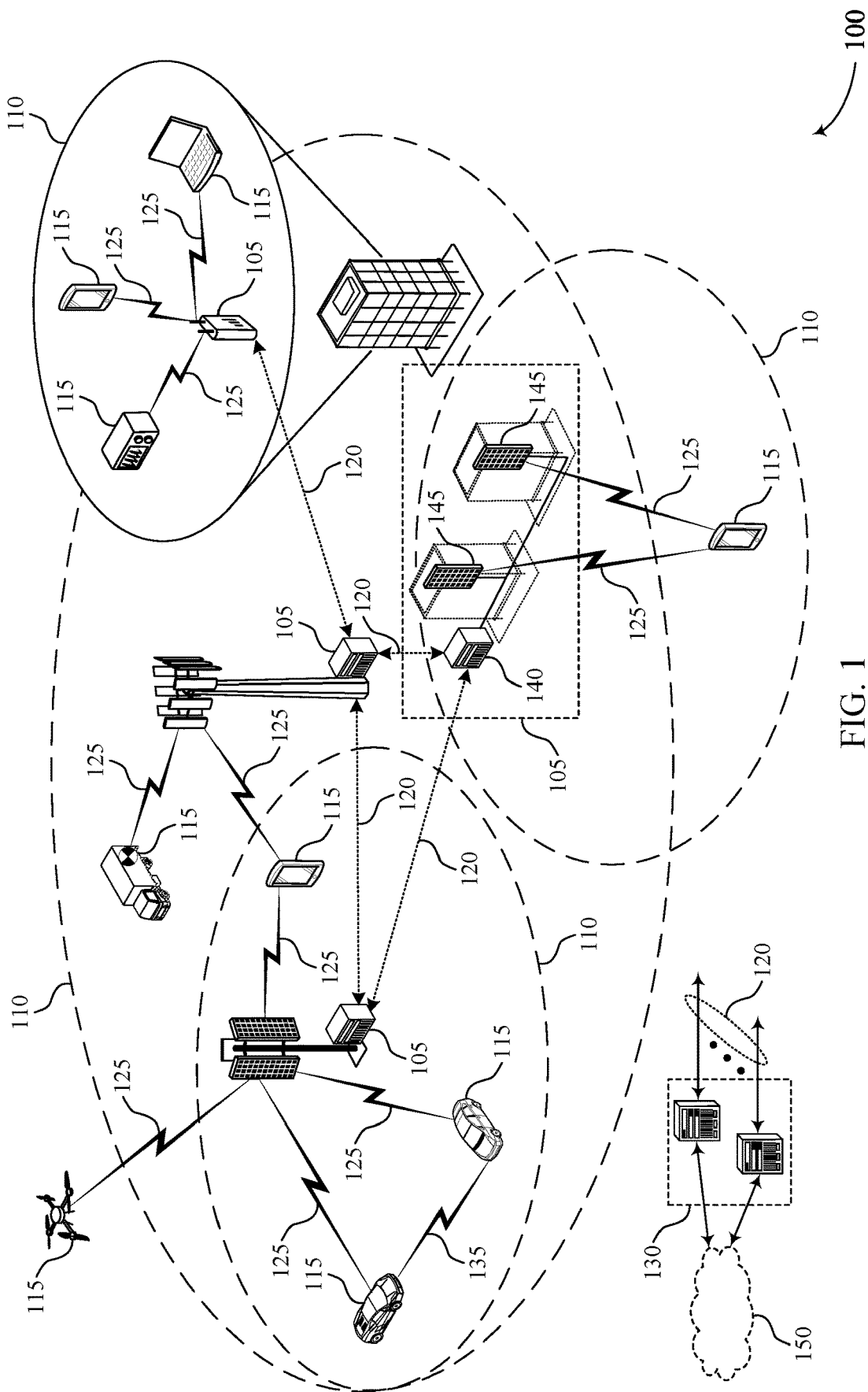
FIGS. 1 and 2 illustrate examples of wireless communications systems that support overlapping physical downlink control channel (PDCCH) candidate thresholds in accordance with aspects of the present disclosure.

Some wireless communications systems may support physical downlink control channel (PDCCH) monitoring, PDCCH repetition, and PDCCH candidate overlapping. For example, a user equipment (UE) may attempt to decode downlink control information (DCI) by performing a process known as a blind decode (BD), during which search spaces are decoded until the DCI is detected. During a blind decode, the UE may attempt descramble one or more potential DCI messages using its cell-radio network temporary identifier (C-RNTI) and perform a cyclic redundancy check (CRC) to determine whether the attempt was successful. In some examples, a number of PDCCH candidates that may be monitored within a time interval (e.g., a slot or a span) may be limited by a BD limit. In some cases, overbooking (e.g., configuring a number of PDCCH candidates that exceed the BD limit for a transmission time interval (TTI)) may be permitted. A user equipment (UE) that has been overbooked may identify configured PDCCH candidates and determine whether or not to monitor configured PDCCH candidates based on one or more rules.

In some examples, two or more PDCCH candidates may overlap. For example, a first PDCCH candidate and a second PDCCH candidate may be configured for a same control resource set (CORESET) on an active downlink bandwidth part (BWP) for a serving cell using the same set of time-frequency resources. In such cases, the first PDCCH candidate and the second PDCCH candidate may have identical scrambling and the corresponding DCI formats for the respective PDCCH candidates may have a same size. Here, the two PDCCH candidates may not be distinguishable from one another based on the identical blind decoding parameters (e.g., having a same CORESET, same control channel elements (CCEs), a same DCI size, a same scrambling), and the UE may accordingly refrain from counting one of the PDCCH candidates for monitoring (e.g., because the UE only performs decoding once for the two overlapping candidates). PDCCH repetitions, where multiple PDCCH candidates may be linked together for repetitions of the same DCI, may also result in a number of overlapping PDCCH candidates that the UE may identify for monitoring.

Because it may be challenging for the base station to prevent overlapping PDCCH candidates as a result of different search space sets having different configuration parameters (e.g., periodicity, slot offset, monitoring symbols), the UE may determine how many overlapping PDCCH candidates are present so that the UE may identify valid PDCCH candidates for monitoring. There may, however, be some ambiguity in how to handle overlapping PDCCH repetitions with respect to identifying which PDCCH candidates are not counted towards the BD limit, particularly in cases where there are relatively large number of overlapping PDCCH candidates. In addition, although a UE may not perform any additional blind decoding of overlapping candidates, the UE may still identify the number of valid PDCCH candidates (and a valid number of blind decodes to be performed) for determining the blind decoding limit, which may unnecessarily increase complexity at the UE.

As described herein, a UE may be configured to monitor the PDCCH in accordance with a threshold (e.g., maximum) number of overlapping PDCCH candidates, including for cases where PDCCH repetition is used. The threshold number of overlapping PDCCH candidates may be defined in the time domain (e.g., per slot, per span, per PDCCH monitoring occasion). Additionally or alternatively, the threshold number of overlapping PDCCH candidates may be defined in the frequency domain (e.g., per component carrier (CC), across multiple CCs). In some examples, the threshold number of overlapping PDCCH candidates may be different for different subcarrier spacings (SCSs), and may also be configured for different PDCCH candidate overlapping scenarios (e.g., overlapping independent PDCCH candidates, overlapping linked PDCCH candidates, or a combination thereof). The threshold number of overlapping PDCCH candidates may be predefined (e.g., in a table) or may be indicated to a base station, for example, via capability signaling from the UE.

Particular aspects of the subject matter described herein may be implemented to realize one or more advantages. The described techniques may support improvements in control channel monitoring. For example, the threshold number of overlapping PDCCH candidates may result in reduced complexity for a UE identifying which, and how many, candidates to monitor for control information. Accordingly, the UE may calculate the number of PDCCH candidates up to the threshold, and refrain from performing one or more other computations, thereby reducing complexity and providing improved efficiency and power consumption at the UE. Thus, the supported techniques may include improved UE operations, and, in some examples, may promote efficiencies in communications (e.g., relatively reduced latency, relatively increased reliability) and power management, among other benefits.

Aspects of the disclosure are initially described in the context of wireless communications systems. Aspects of the disclosure are then described in the context of resource diagrams and process flows. Aspects of the disclosure are further illustrated by and described with reference to apparatus diagrams, system diagrams, and flowcharts that relate to overlapping PDCCH candidate thresholds.

FIG. 1 illustrates an example of a wireless communications system 100 that supports overlapping PDCCH candidate thresholds in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink CCs and one or more uplink CCs according to a carrier aggregation configuration. Carrier aggregation may be used with both frequency division duplexing (FDD) and time division duplexing (TDD) CCs.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and SCS are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a SCS ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported SCS, and $\Delta f_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on SCS. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the SCS or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels (ALs) arranged in a cascaded manner. An AL for a control channel candidate may refer to a number of control channel resources (e.g., CCEs) associated with encoded information for a control information format having a given payload size. Search space sets may include common search space sets configured for sending control information to multiple UEs 115 and UE-specific search space sets for sending control information to a specific UE 115.

PDCCH carries DCI in CCEs, which may, for example, include nine logically-contiguous resource element groups (REGs), where each REG contains four resource elements (REs). DCI includes information regarding downlink scheduling assignments, uplink resource grants, transmission scheme, uplink power control, hybrid automatic repeat request (HARD) information, MCS, and other information. The size and format of the DCI messages may differ depending on the type and amount of information that is carried by the DCI. For example, if spatial multiplexing is supported, the size of the DCI message may be relatively large compared to contiguous frequency allocations. Similarly, for a system that employs MIMO, the DCI may include additional signaling information. The DCI size and format may depend on an amount of information as well as other factors such as bandwidth, a number of antenna ports, duplexing mode, or the like.

PDCCH may carry DCI messages associated with multiple users, and each UE 115 may decode the DCI messages that are intended for it. For example, each UE 115 may be assigned a C-RNTI and CRC bits attached to each DCI may be scrambled based on the C-RNTI. To reduce power consumption and overhead at the UE 115, a limited set of CCE locations can be specified for DCI associated with a specific UE 115. CCEs may be grouped (e.g., in groups of one, two, four, and eight CCEs), and a set of CCE locations in which the user equipment may find relevant DCI may be specified. These CCEs may be known as a search space. In some examples, the search space may be partitioned into two regions: a common CCE region or search space and a UE-specific (dedicated) CCE region or search space. The common CCE region may be monitored by all UEs 115 served by a base station 105 and may include information such as paging information, system information, random access procedures, and the like. The UE-specific search space may include user-specific control information. CCEs may be indexed, and the common search space may start from CCE 0. The starting index for a UE-specific search space may depend on the C-RNTI, the subframe index, the CCE aggregation level, and a random seed. A UE 115 may attempt to decode DCI by performing a process known as a blind decode, during which search spaces are randomly decoded until the DCI is detected. During a blind decode, the UE 115 may attempt descramble all potential DCI messages using its C-RNTI, and perform a CRC check to determine whether the attempt was successful.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple CCs.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super-high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with CCs operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In wireless communications system 100, control information (e.g., DCI) may be signaled to a UE 115 via PDCCH to schedule communications between a base station 105 and a UE 115. The UE may monitor one or more CORESETs in a BWP for PDCCH candidates, and a search space set may be associated with one CORESET, and there may be up to 10 search space sets in a BWP of a CC. The UE may accordingly monitor multiple PDCCH candidates that may be located in different PDCCH monitoring occasions of the search space sets, and DCI may be received within one PDCCH candidate based on the monitoring. Wireless communications system 100 may support PDCCH repetition, where multiple PDCCH candidates may be linked together for repetitions of the same DCI.

To prevent relatively high complexity and power consumption associated with a UE searching PDCCH for DCI, there may be a threshold (e.g., a maximum) number of monitored PDCCH candidates, where the threshold may be referred to as a BD limit. In cases where one PDCCH candidate overlaps with another PDCCH candidate (e.g., in a same CORESET, for a same serving cell using a same set of CCEs, having identical scrambling, and having the same DCI format), then one of the PDCCH candidates may not be counted towards the BD limit (e.g., because the UE 115 only performs decoding once for the overlapping candidates).

In the case of PDCCH repetitions, however, there may be some ambiguity in how to handle overlapping PDCCH repetitions with respect to identifying which PDCCH candidates are not counted towards the blind decode limit, particularly in cases where there are relatively large number of overlapping PDCCH candidates. In addition, although a UE 115 may not perform any additional blind decoding of overlapping candidates, the UE 115 may still need to identify the number of valid PDCCH candidates (and a valid number of blind decodes to be performed) for determining the blind decoding limit, which may unnecessarily increase complexity at the UE 115.

Wireless communications system 100 may support a threshold number of overlapping PDCCH candidates, including for cases where PDCCH repetition is used. The threshold number of overlapping PDCCH candidates may be defined in the time domain (e.g., per slot, per span, per PDCCH monitoring occasion). Additionally or alternatively, the threshold number of overlapping PDCCH candidates may be defined in the frequency domain (e.g., per CC or across multiple CCs). In some examples, the threshold number of overlapping PDCCH candidates may be different for different SCSs, and may also be configured for different PDCCH candidate overlapping scenarios (e.g., overlapping independent PDCCH candidates, overlapping linked PDCCH candidates, or a combination thereof). In some examples, the overlapping scenarios may be based on one or more PDCCH monitoring configurations. The threshold number of overlapping PDCCH candidates may be pre-defined (e.g., in a table) or may be indicated to a base station 105, for example, via capability signaling from the UE 115. When calculating (e.g., counting) the number of PDCCH candidates towards the threshold (e.g., based on the one or more PDCCH monitoring configurations), the UE 115 may determine a total number of overlapping PDCCH candidates and subtract some quantity (e.g., one) from the total number of overlapping PDCCH candidates. Additionally or alternatively, the number of PDCCH candidates may be counted based on a number of overlapping PDCCH candidate pairs. In any case, the threshold number of overlapping PDCCH candidates may support relatively reduced complexity at the UE 115 by limiting a number of overlapping PDCCH candidates the UE 115 identifies for PDCCH monitoring.

Figure 2:
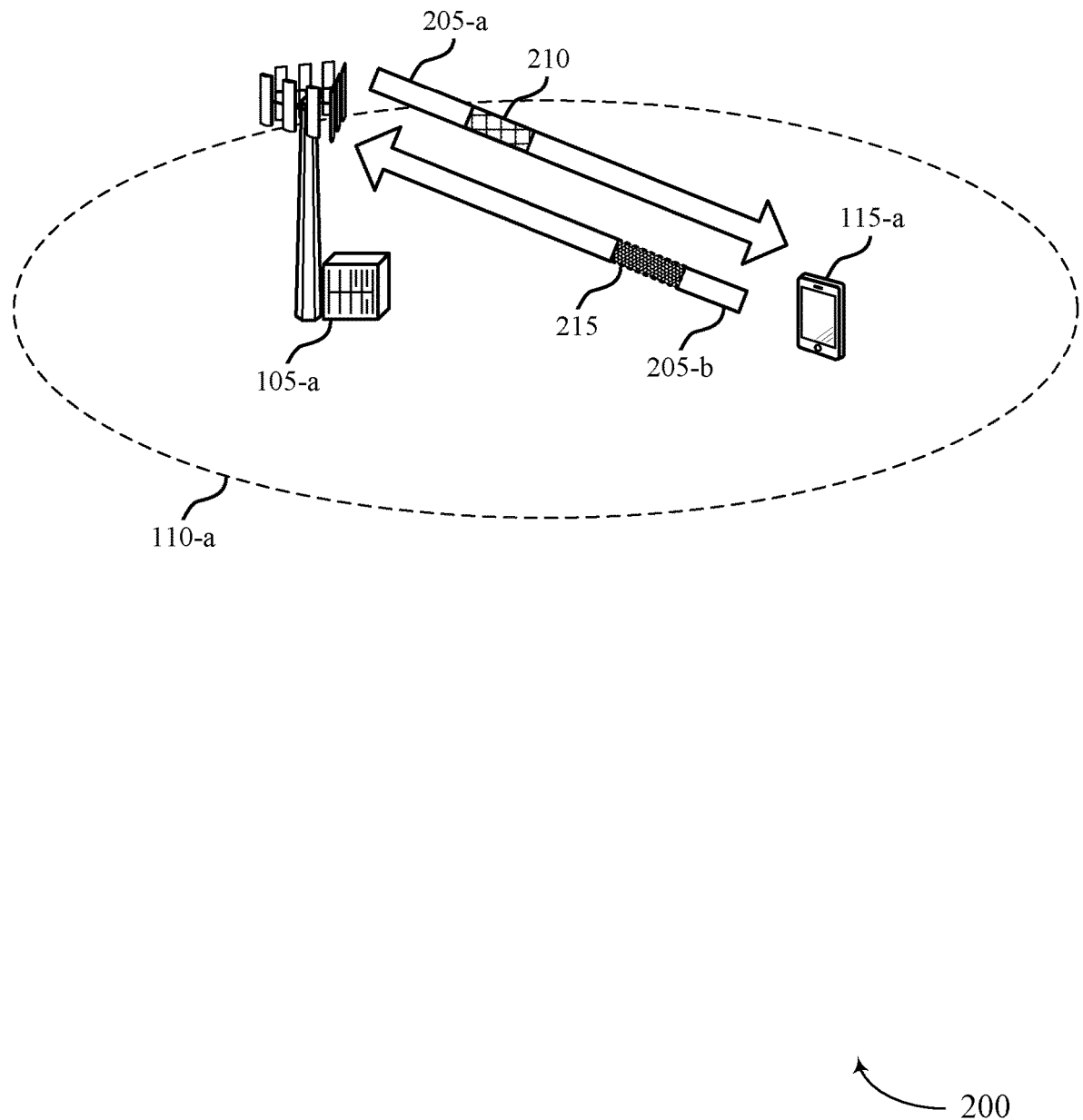

FIG. 2 illustrates an example of a wireless communications system 200 that supports overlapping PDCCH candidate thresholds in accordance with aspects of the present disclosure. In some examples, wireless communications system 200 may implement aspects of wireless communications system 100. The wireless communications system 200 may illustrate communications between a base station 105-*a* and a UE 115-*a* which may be examples of corresponding devices as described with reference to FIG. 1. In some cases, the base station 105-*a* may serve a geographic coverage area 110-*a*, providing service to one or more other devices such as UE 115-*a*. In some examples, the wireless communications system 200 may support the base station 105-*a* transmitting control information to the UE 115-*a* using one or more overlapping PDCCH candidates, where the UE 115-*a* may use a threshold number of overlapping PDCCH candidates when identifying PDCCH candidates for monitoring.

In some aspects, UE 115-*a* may be configured with one or more CORESETs in a BWP of a serving cell. For example, UE 115-*a* may be configured with three, five, or some other number of CORESETs in a BWP configured by base station 105-*a*. In some cases, each CORESET may be associated with one active transmission configuration indicator (TCI) state. For example, as part of the configuration of the CORESET for UE 115-*a* by base station 105-*a*, the number of resource blocks of the CORESET in the frequency domain and the number of symbols of the CORESET in the time domain (e.g., one, two, or three OFDM symbols) may be radio resource control (RRC) configured for UE 115-*a*.

In some examples, wireless communications system 200 may support PDCCH monitoring in one or more search space sets. In some aspects, each search space set may be associated with one CORESET. There may be, for instance, up to ten search space sets in a BWP of a CC. As part of a search space set configuration, RRC signaling may be used to configure the associated CORESET, the periodicity and offset of the monitored slots and the symbols to be monitored within the slot in the time domain, the DCI formats to be monitored, the number of PDCCH candidates for a given AL, and the like. The PDCCH candidates may be defined as part of a search space set configuration. For example, the PDCCH candidate with a given AL in a given PDCCH candidate index may be defined in a given search space set. A DCI may be conveyed in one PDCCH candidate. For example, base station 105-*a* may configure a first search space set including a first group of PDCCH monitoring occasions and a second search space set including a second group of PDCCH monitoring occasions. Each monitoring occasion may be configured with one or more PDCCH candidates (e.g., PDCCH candidates included in a monitoring occasion, PDCCH candidates included in a monitoring occasion, or the like).

UE 115-*a* may monitor PDCCH candidates in various search space sets to receive one or more DCI messages. UE 115-*a* may determine that PDCCH candidates have passed a CRC (e.g., UE 115-*a* may attempt to blindly decode each PDCCH candidate, with a blind decoding attempt where the PDCCH candidate passes the CRC check corresponding to a successfully decoded DCI).

In some cases, there may be a limit (e.g., a maximum number) of monitored PDCCH candidates that UE 115-*a* may attempt to blindly decode (e.g., a blind decoding limit, which may be also referred to as a maximum BD count, a BD limit, a monitored PDCCH candidate limit, or the like). The BD limit may be based on a given transmission time interval (e.g., a slot, span, or other duration in the time domain). For example, a separate BD limit may be supported per downlink serving cell according to a basic unit of the limit for one CC. In some cases, the BD limit may be fixed and may depend on an SCS of the slot per serving cell. For example, a maximum number of monitored PDCCH candidates per slot or downlink BWP with different SCS configurations for a single serving cell may range from 20-44 based on the SCS configuration (e.g., for $\mu=0, 1, 2, 3$ respectively, where $\mu$ corresponds to an SCS configuration). In other examples, there may be a maximum number of monitored PDCCH candidates in a span for a combination (e.g., denoted (X, Y)) for a bandwidth part having some SCS configuration, $\mu$ (e.g., for $\mu=0, 1$).

In some cases, a pair of PDCCH candidates may overlap. For example, a first PDCCH candidate and a second PDCCH candidate may be configured for a same CORESET on an active downlink BWP for a serving cell using the same set of CCEs. In such an example, the first PDCCH candidate and the second PDCCH candidate may have identical scrambling and the corresponding DCI formats for the PDCCH candidates may have a same size. As a result, the two PDCCH candidates with identical blind decoding parameters (e.g., having a same CORESET, same CCEs, a same DCI size, a same scrambling) may not be distinguished from one another. In addition, it may be difficult for the base station 105-*a* to prevent such overlapping because different search space sets have different configuration parameters (e.g., periodicity, slot offset, monitoring symbols). As such, the base station 105-*a* may overbook the UE 115-*a* with PDCCH candidates, where the UE 115-*a* may refrain from, or otherwise ignore counting a PDCCH candidate of the PDCCH candidate pair towards a number of monitored PDCCH candidates, up until the BD limit. For example, if the first PDCCH candidate and the second PDCCH candidate are in different search space sets, the UE 115-*a* may refrain from counting the PDCCH candidate with the larger search space set index. Alternatively, if the first PDCCH candidate and the second PDCCH candidate are in the same search space set, the UE 115-*a* may refrain from counting the PDCCH candidate with the larger candidate index.

Wireless communications system 200 may support PDCCH repetition. For example, PDCCH candidates in various search space sets may include repetition-based PDCCH candidates where, a PDCCH candidate in a first search space set may be linked for repetition to another PDCCH candidate in another search space set for monitoring. In such examples, a first PDCCH candidate of a first search space set may be located in a first monitoring occasion, and the first PDCCH candidate may be linked to a second PDCCH candidate located in a second monitoring occasion of a second search space set. The PDCCH candidates may be linked in accordance with the search space sets being linked, a monitoring occasion mapping, and the like. In some examples, base station 105-*a* may transmit DCI messages using PDCCH repetition over the two linked PDCCH candidates (e.g., respective PDCCH candidates that may be linked for PDCCH repetition). For instance, base station 105-*a* may transmit a first repetition of the DCI message on the first PDCCH candidate, and a second repetition of the DCI message on the second PDCCH candidate. In some examples, UE 115-*a* may perform a soft combining procedure on the first PDCCH candidate and the second PDCCH candidate, resulting in a soft combined PDCCH candidate. In some cases, the UE 115-*a* may consider the soft combined PDCCH candidate as an additionally monitored PDCCH candidate.

In some cases, a linked PDCCH candidate may overlap with an individual, non-linked, PDCCH candidate. For example, a first PDCCH candidate may overlap with a second PDCCH candidate (e.g., sharing the same CORESET, CCEs, DCI size, and scrambling as the first PDCCH candidate), where the first PDCCH candidate may be linked with a third PDCCH candidate and the second PDCCH candidate may be an individual PDCCH candidate (e.g., not linked to any other candidate, a non-linked PDCCH candidate). In some cases, the UE 115-*a* may refrain from counting the first PDCCH candidate or the second PDCCH candidate towards the number of monitored PDCCH candidates based on whether the PDCCH candidate is an individual candidate, an search space index, or the like.

In some examples, the complexity of PDCCH monitoring may be mitigated by the BD limit. However, in some cases, a number of overlapping PDCCH candidate pairs may not be limited by the BD limit, leading to one or more deficiencies. For example, with a 30 kHz SCS (e.g., $\mu=1$), 360 PDCCH candidates may be configured in a slot (e.g., by 10 different search space sets). Out of the 360 configured PDCCH candidates, the UE 115-*a* may monitor and count a relatively small number of PDCCH candidates as compared to the number of configured PDCCH candidates. For example, the UE 115-*a* may monitor and count 36 PDCCH candidates (e.g., the BD limit for $\mu=1$). Before performing the blind decoding operation for the PDCCH candidates, the UE 115-*a* may identify overlapping PDCCH candidate pairs, where the UE 115-*a* may perform duplicate identification or duplicate check based thereon. As such, the UE 115-*a* may identify valid blind decodes, for example, to identify non-redundant, or non-duplicate candidates. In the case of a relatively large number of configured duplicate candidates (e.g., as compared to a number of monitored PDCCH candidates), UE 115-*a* complexity may increase. Such complexity may be intensified in cases where one of the overlapped PDCCH candidates is a linked candidate as more conditions may be considered (e.g., whether candidates are linked or not, or how to interpret a detected DCI).

As described herein, wireless communications system 200 may support a limit on a number of overlapping PDCCH candidates. In particular, wireless communications system 200 may support a limit on a number of overlapping PDCCH candidates (e.g., a threshold number of overlapping PDCCH candidates) the UE 115-*a* may monitor that have the same set of CCEs (e.g., same time-frequency resources), are associated with the same CORESET, have the same scrambling, have a same DCI size, and are associated with the same serving cell (e.g., having a same carrier indicator field (CIF) value). As such, the UE 115-*a* may determine a threshold number of overlapping PDCCH candidates.

In some examples, the UE 115-*a* may determine the threshold with respect to the time domain. For example, the UE 115-*a* may determine the threshold per slot, per span (e.g., per number of consecutive symbols in a slot where the UE 115-*a* may be configured to monitor the PDCCH), per PDCCH monitoring occasion, or any other time period associated with PDCCH monitoring. Additionally or alternatively, the UE 115-*a* may determine the threshold number of overlapping PDCCH candidates with respect to the frequency domain. For example, the UE 115-*a* may determine the threshold number of overlapping PDCCH candidates per CC, across all CCs, or both (e.g., a first threshold for each CC and a second threshold for all CCs). In the case where the threshold number of overlapping PDCCH candidates is defined per CC, the UE 115-*a* may determine the threshold number of overlapping PDCCH candidates per scheduled CC (e.g., per CC scheduled by a same CC or another CC) or per scheduling CC (e.g., a CC that schedules one or more other CCs). When a threshold number of overlapping PDCCH candidates is defined per scheduling CC, the UE 115-*a* may apply, or otherwise correspond the threshold number of overlapping PDCCH candidates to one or more CCs scheduled by the scheduling CC. Additionally or alternatively, the threshold number of overlapping PDCCH candidates may vary for different SCS values. For example, the UE 115-*a* may determine the threshold number of overlapping PDCCH candidates to be smaller for larger SCS values.

As described herein, an overlapping PDCCH candidate may be defined as a PDCCH candidate that may not be counted for PDCCH monitoring (e.g., not counted towards a BD limit) in accordance with one or more rules. Additionally or alternatively, overlapping PDCCH candidates may be defined in cases where at least two PDCCH candidates have a same set of CCEs (e.g., same time/frequency resources), are associated with a same CORESET, have a same scrambling, have a same DCI size, and are associated with a same serving cell (e.g., same scheduled serving cell, associated with a same CIF value). In such cases, the at least two PDCCH candidates may be said to be overlapping PDCCH candidates.

In some examples, the UE 115-a may determine the threshold number of overlapping PDCCH candidates based on one or more predefined values (e.g., preconfigured values), for example, defined in a table. In such an example, the predefined values may be different for varying SCS values, different overlapping scenarios (e.g., where PDCCH candidates may be non-linked candidates, linked candidates for PDCCH repetitions, or both), or the like. Additionally or alternatively, the UE 115-a may determine the threshold number of overlapping PDCCH candidates based on UE capability signaling 215. The UE capability signaling 215 may include an indication of the threshold number of overlapping PDCCH candidates. The UE 115-a may determine and transmit such UE capability signaling 215 per SCS, per overlapping scenario, or both, and the capability may be defined per UE 115 (e.g., the capability may be UE-specific), per radio frequency band, per radio frequency band combination, per radio frequency band of a radio frequency band combination, and the like. As an example, if the UE capability signaling 215 is per radio frequency band combination, a same threshold number of PDCCH candidates (e.g., indicated by the UE capability signaling 215) is assumed for a number of CCs (e.g., all CCs) in the indicated radio frequency band combination. In some cases, the UE capability signaling 215 may include an indication of whether the UE 115-a supports PDCCH repetition. For example, if the UE 115-a indicates the capability to support PDCCH repetition, the UE 115-a may use the threshold number of overlapping PDCCH candidates when monitoring the PDCCH. In other cases, the UE 115-a may transmit the UE capability signaling 215 irrespective of PDCCH repetition.

The UE 115-a may monitor the PDCCH according to overlapping PDCCH candidate thresholds which may vary by PDCCH overlapping scenario. In some examples, the UE 115-a may use a first threshold number of overlapping PDCCH candidates when monitoring overlapping individual PDCCH candidates. For example, a first, individual PDCCH candidate (e.g., a PDCCH candidate that is not associated with PDCCH repetition and is not linked to another PDCCH candidate) and a second, individual PDCCH candidate may overlap, where the UE 115-a may monitor the first PDCCH candidate and the second PDCCH candidate according to the first threshold number of overlapping PDCCH candidates. In some cases, the UE 115-a may anticipate the number of overlapping PDCCH candidates to be less than or equal to the threshold number of overlapping candidates.

In some examples, the UE 115-a may use a second threshold number of overlapping PDCCH candidates when monitoring overlapping individual and linked PDCCH candidates. For example, a third, individual PDCCH candidate and a fourth, linked PDCCH candidate (e.g., linked to another PDCCH candidate different from the third PDCCH candidate based on PDCCH repetition) may overlap where the UE 115-a may monitor the PDCCH according to the second threshold number of overlapping PDCCH candidates. In such examples, the UE 115-a may anticipate the number of overlapping PDCCH candidates to be less than or equal to the threshold number of overlapping candidates. In some examples, the UE 115-a may use a third threshold number of overlapping PDCCH candidates when monitoring overlapping linked PDCCH candidates. For example, a fifth, linked PDCCH candidate and a sixth, linked PDCCH candidate (e.g., linked to a PDCCH candidate different from the fifth PDCCH candidate) may overlap where the UE 115-a may monitor the PDCCH according to the third threshold number of overlapping PDCCH candidates. In such examples, the UE 115-a may anticipate the number of overlapping PDCCH candidates to be less than or equal to the threshold number of overlapping candidates.

In some cases, such as when more than two PDCCH candidates overlap, the UE 115-a may count overlapping PDCCH candidates according to a specific counting rule. In some examples, the UE 115-a may count the number of overlaps as the number of candidates not counted toward the BD limit. For example, four different PDCCH candidates may overlap and the UE 115-a may count three overlaps in accordance with three PDCCH candidates not being counted towards the BD limit. Here, the number of candidates that may not be counted toward the BD limit may be equal to a total number of PDCCH candidates minus some quantity (e.g., minus one). Additionally or alternatively, the UE 115-a may count the number of overlaps as the number of overlapping candidate pairs (e.g., according to a combinatoric operation). As per the previous example, the UE 115-a may count four choose two (e.g., $$\binom{4}{2}),$$

or six, overlaps as mere are six such overlapping candidate pairs when four PDCCH candidates overlap.

The UE 115-a being configured to refrain from monitoring overlapping PDCCH candidates past a threshold number of overlapping PDCCH candidates may reduce complexity at the UE 115-a, increasing system efficiency and reducing system latency associated with gathering DCI. Put another way, an overlapping PDCCH candidate limit may prevent the UE 115-a from excess calculations when identifying a number of valid PDCCH candidates for PDCCH monitoring.

Figure 3A:
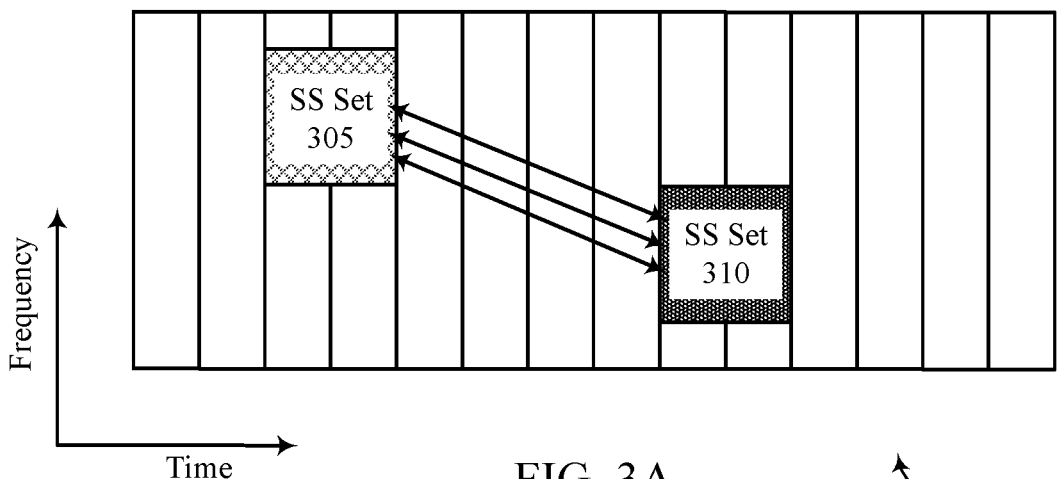
FIGS. 3A, 3B, and 3C illustrate examples of resource diagrams that support overlapping PDCCH candidate thresholds in accordance with aspects of the present disclosure.
Figure 3B:
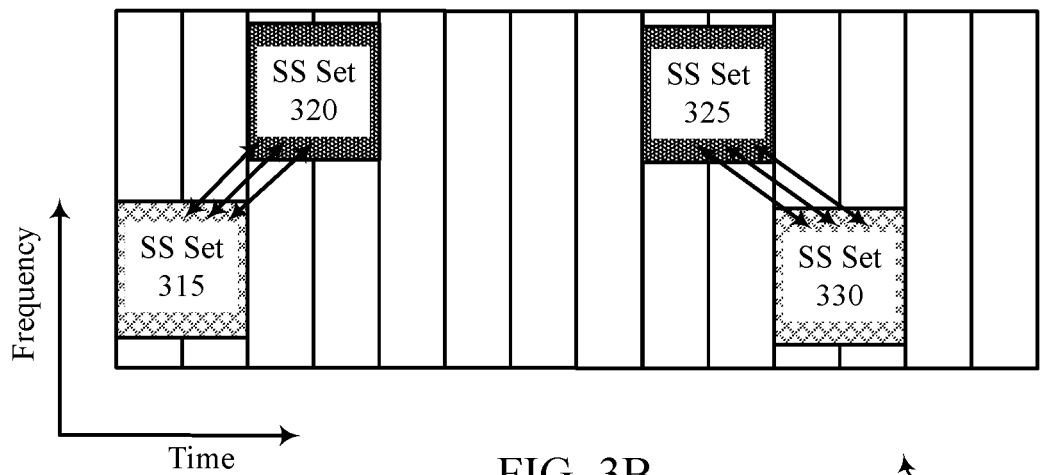
Figure 3C:
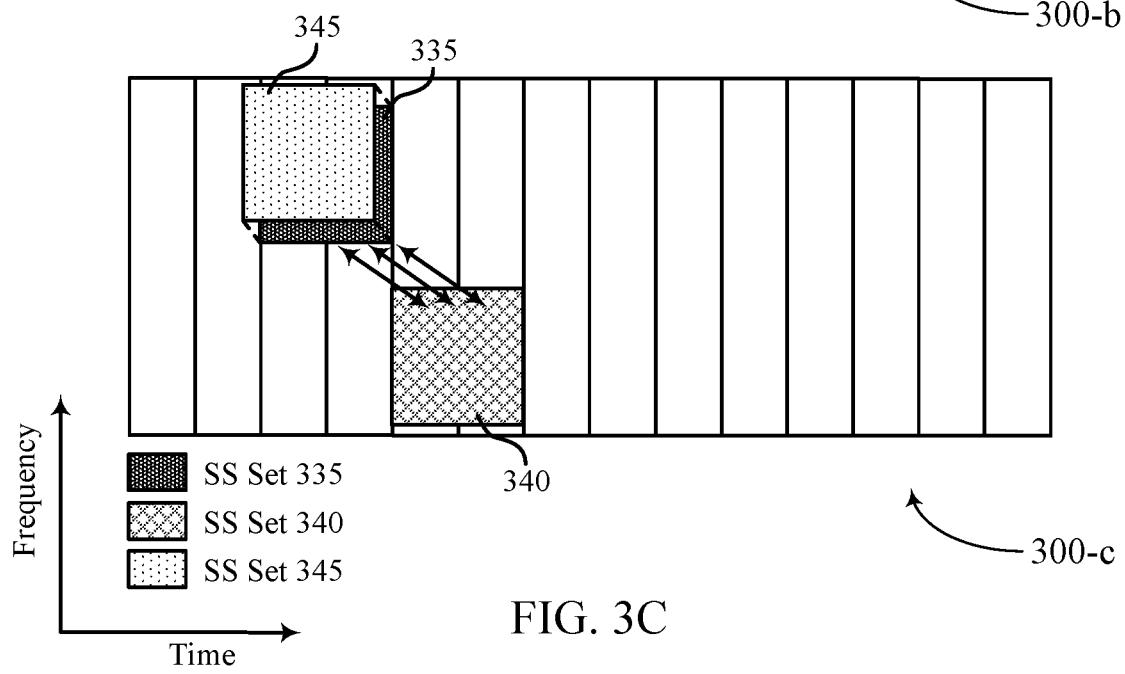

FIGS. 3A through 3C illustrate examples of resource diagrams 300 (e.g., resource diagram 300-a, 300-b, 300-c) that support overlapping PDCCH candidate thresholds in accordance with aspects of the present disclosure. In some examples, the resource diagrams 300 may implement aspects of wireless communications system 100 or 200. For example, resource diagrams 300 may depict resource allocation for a control channel (e.g., a PDCCH) monitored by receiving devices (e.g., a UE). In some examples, the resource diagrams 300 may represent PDCCH candidates on which a base station may transmit control information to one or more UEs. In particular, the base station may transmit the control information in one or more PDCCH candidates within one or more respective search space sets. PDCCH candidates, search space sets, or the like may be linked with one another, may overlap with one another, or may otherwise correspond to one another, as described with reference to FIG. 2, where UEs monitoring such PDCCH candidates or search space sets may not expect a number of overlapping PDCCH candidates to be greater than a threshold number of overlapping PDCCH candidates as described herein.

In some examples, the resource diagram 300-a illustrated by FIG. 3A may depict an example of a PDCCH which may support repetition-based PDCCH candidates. For example, resource diagram 300-a may include search space set 305 including a first PDCCH candidate located in a first monitoring occasion where the first PDCCH candidate may be linked a second PDCCH candidate located in a second monitoring occasion within search space set 310. In some examples, the first PDCCH candidate and the second PDCCH candidate may be linked in accordance with the search space sets being linked, a monitoring occasion mapping, and the like. For example, the search space set 305 and the search space set 310 may be linked by respective RRC configurations, indicating a linking between the first PDCCH candidate and the second PDCCH candidate. That is, a base station may transmit an RRC configuration to a UE, where the RRC configuration may indicate a linking between the search space set 305 and the search space set 310. As such, the first PDCCH candidate and the second PDCCH candidate may be linked candidates. Further, the first monitoring occasion and the second monitoring occasion may be one-to-one mapped, further linking the first PDCCH candidate and the second PDCCH candidate. In some examples, the first PDCCH candidate and the second PDCCH candidate may have the same AL (e.g., having the same number of CCEs). PDCCH candidates with the same AL and the same candidate index in two linked search space sets may be considered linked PDCCH candidates. Further, two linked search space sets may be configured to include a same number of candidates for each AL. In some examples, the first PDCCH candidate and the second PDCCH candidate may be located in the same slot, or in different slots. For example, in resource diagram 300-a, the search space set 305 and the search space set 310 may not overlap in time, however, in some cases, the search space sets may overlap in time without nullifying a PDCCH candidate linkage.

In some examples, the resource diagram 300-b illustrated by FIG. 3B may depict another example of a PDCCH which may support repetition-based PDCCH candidates. For example, resource diagram 300-b may include search space set 315 including a first PDCCH candidate located in a first monitoring occasion where the first PDCCH candidate may be linked a second PDCCH candidate located in a second monitoring occasion within search space set 320. Likewise, resource diagram 300-b may include search space set 325 including a third PDCCH candidate located in a third monitoring occasion where the third PDCCH candidate may be linked a fourth PDCCH candidate located in a fourth monitoring occasion within search space set 330.

In some examples, the resource diagram 300-c illustrated by FIG. 3C may depict an example of a PDCCH which may support both repetition-based PDCCH candidates and PDCCH candidate overlapping. For example, resource diagram 300-c may include search space set 335 including a first PDCCH candidate located in a first monitoring occasion where the search space set 335 may at least partially overlap with the search space set 345. In some examples, the search space set 335 may overlap with the search space set 345 such that the first PDCCH candidate may have a same CORESET, CCEs, scrambling, and DCI size as a second, individual PDCCH candidate located in a second monitoring occasion within search space set 345. Further, the first PDCCH candidate may be linked to a third PDCCH candidate in a third monitoring occasion within search space set 340.

UEs monitoring a PDCCH configured according to resource diagram 300-c may refrain from counting the first PDCCH candidate or the second PDCCH candidate towards the number of monitored PDCCH candidates. In some cases, a UE may refrain from counting the second PDCCH candidate (e.g., the individual candidate) towards the number of monitored PDCCH candidates based on the second PDCCH candidate being non-linked. In other cases, the UE may refrain from counting the PDCCH candidate with a higher search space index. For example, search space set 335 may have an search space set index "x," search space set 340 may have an search space set index "y," and search space set 345 may have an search space set index "z." In some cases, x may be greater than z, and as such, the UE may refrain from counting the first PDCCH candidate. Additionally or alternatively, the UE may refrain from counting the PDCCH candidate with a higher search space priority (e.g., search space index), where the search space priority of the linked search space set (e.g., search space set 335) may be based on the minimum search space index between the linked search space sets (e.g., min(x, y)). As per the previous example, y may be less than x, and as such, the UE may compare the indices y and z. In such an example, y may be greater than z, and thus, the UE may refrain from counting the first PDCCH candidate.

In some examples, there may be a limit on the number of overlapping PDCCH candidates that UEs may monitor, as described with reference to FIG. 2. For example, a UE may determine a threshold number of overlapping PDCCH candidates of which may limit the number of overlapping PDCCH candidates that the UE may count as valid for monitoring. In some examples, the UE may monitor and count a number of overlapping PDCCH candidates, such as the first PDCCH candidate and the second PDCCH candidate in search space set 335 and search space set 345, respectively. In the case where the counted number of overlapping PDCCH candidates satisfies (e.g., is less than or equal to) the threshold number of overlapping PDCCH candidates, the UE may not expect the number of overlapping PDCCH candidates to be greater than the threshold number of overlapping PDCCH candidates (e.g., corresponding to a BD limit), thereby reducing complexity at the UE, for example, due to a limit on the number of overlapping PDCCH candidates that are identified.

Figure 4:
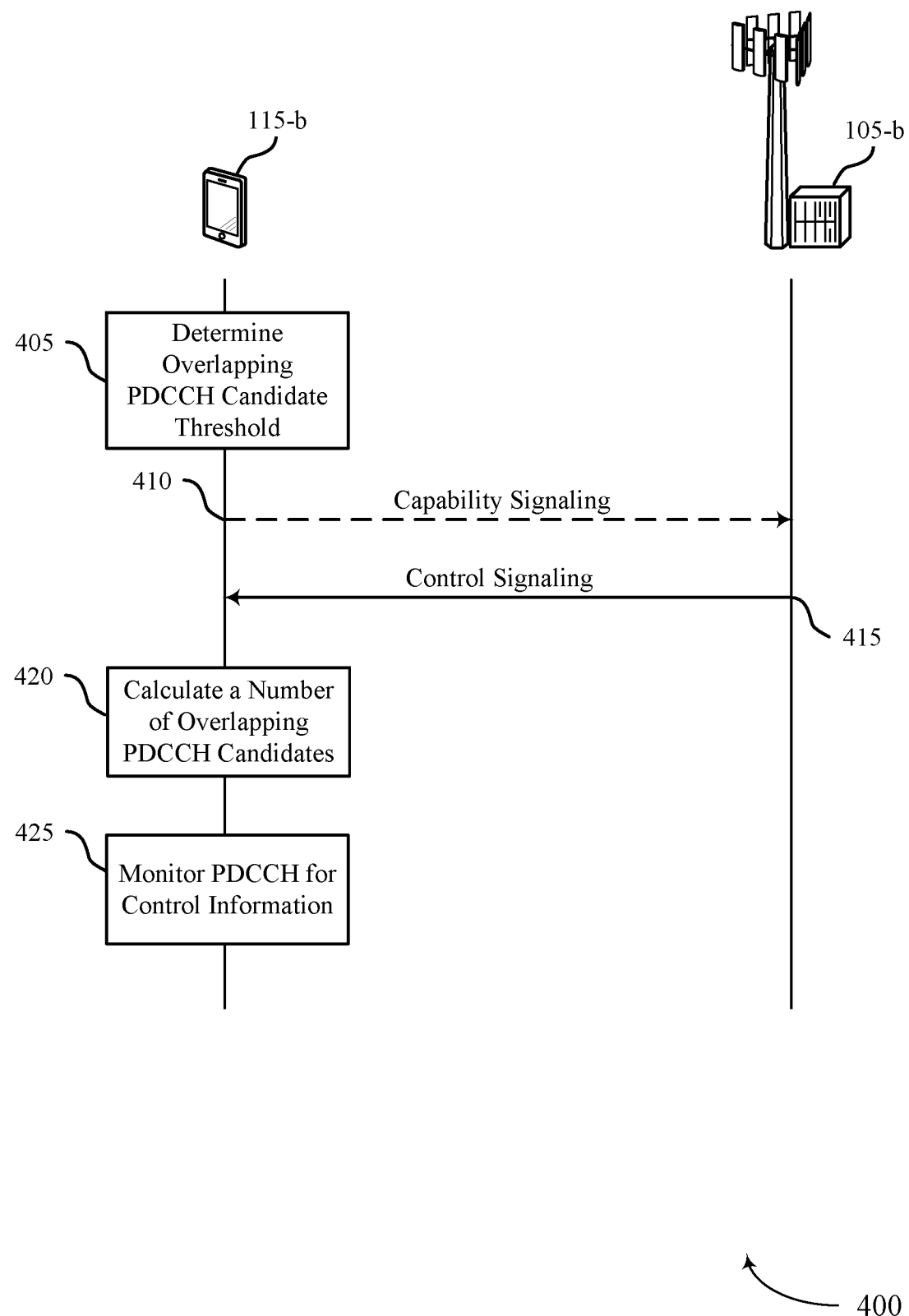
FIG. 4 illustrates an example of a process flow that supports overlapping PDCCH candidate thresholds in accordance with aspects of the present disclosure.

FIG. 4 illustrates an example of a process flow 400 that supports overlapping PDCCH candidate thresholds in accordance with aspects of the present disclosure. In some examples, the process flow 400 may implement aspects of wireless communications system 100 or 200, as described with reference to FIGS. 1 and 2, respectively. For example, UE 115-b and base station 105-b—which may be examples of the corresponding devices described with reference to FIGS. 1 and 2—may communicate using one or more communication links, where the base station 105-b may transmit control information to the UE 115-b using a PDCCH. The UE 115-b may be operable to monitor and count PDCCH candidates in accordance with a threshold number of overlapping PDCCH candidates as described with reference to FIGS. 1-3. Alternative aspects of the following may be implemented, where some steps are performed in a different order than described or are not performed at all. In some implementations, steps may include additional features not mentioned below, or further steps may be added.

At 405, the UE 115-b may determine a PDCCH candidate threshold. For example, the UE 115-b may be configured to determine, for each SCS configuration of a set of SCS configurations, a threshold number of overlapping PDCCH candidates within a time interval (e.g., a slot, a span, a PDCCH monitoring occasion). Overlapping PDCCH candidates may be associated with a same set of time-frequency resources (e.g., CCEs), a same CORESET, a same scrambling sequence, a same DCI size, and a same CIF. In some examples, the UE 115-b may determine a first threshold number of overlapping PDCCH candidates for a first SCS configuration of the set of SCS configurations and may determine a second threshold number of overlapping PDCCH candidates, different from the first threshold number of overlapping PDCCH candidates, for a second SCS configuration of the set of SCS configurations. Additionally or alternatively, the UE 115-*b* may determine the threshold number of overlapping PDCCH candidates with respect to the frequency domain. For example, the UE 115-*b* may determine the threshold number(s) of overlapping PDCCH candidates per frequency band, combination of frequency bands, CC, scheduling CC, scheduled CC, all CCs, or any combination thereof as described with reference to FIG. 2. The UE 115-*b* may identify the one or more threshold numbers of overlapping PDCCH candidates from a set of predefined PDCCH candidate thresholds, for example, defined in a table known to the UE 115-*b* or any other device. In some examples, the predefined PDCCH candidate thresholds may be based on an SCS, PDCCH monitoring configurations, or a combination thereof. Additionally or alternatively, the UE 115-*b* may determine the threshold number(s) of overlapping PDCCH candidates in accordance with, or otherwise based on UE capability signaling, such as transmitted at 410.

In some examples, at 410, the UE 115-*b* may transmit capability signaling to the base station 105-*b*, including at least an indication of the threshold number(s) of overlapping PDCCH candidates. The UE 115-*b* may indicate such capability signaling per radio frequency band, per radio frequency band combination, or a combination thereof. In other words, the UE 115-*b* may define a threshold number of overlapping PDCCH candidates per frequency band, combination of frequency bands, or the like, and may transmit the capability signaling to the base station 105-*b* accordingly. In some examples, the capability signaling may include the indication of the threshold number(s) of overlapping PDCCH candidates per SCS configuration, per PDCCH monitoring configuration (e.g., that may configure various PDCCH candidate monitoring scenarios), per slot, per span, or any other time period, or a combination thereof. Additionally or alternatively, the capability signaling may indicate that the UE 115-*b* supports PDCCH repetition.

At 415, the base station 105-*b* may transmit control signaling to the UE 115-*b*. Within the control signaling, the base station 105-*b* may indicate one or more PDCCH monitoring configurations. For example, the base station 105-*b* may indicate one or more parameters for the UE 115-*b* to use when monitoring the PDCCH, such as a transmission periodicity, slot offsets, monitoring symbols, or any other parameter associated with monitoring the PDCCH.

At 420, the UE 115-*b* may calculate a number of overlapping PDCCH candidates based on the PDCCH monitoring configurations. In an example, the UE 115-*b* may determine a total number of overlapping PDCCH candidates within a time interval (e.g., within a slot, within a span, or the like). In such an example, the UE 115-*b* may subtract a quantity from the total number of overlapping PDCCH candidates. In some cases, the number of overlapping PDCCH candidates may be determined based on a result of such subtraction. For example, there may be four overlapping PDCCH candidates, where the UE 115-*b* may determine there to be three overlaps. In such an example, the UE 115-*b* may subtract the quantity "1" from the overlapping PDCCH candidates, resulting in three overlapping PDCCH candidates. The UE 115-*b* may thus determine to count the three overlapping PDCCH candidates towards the number overlapping PDCCH candidates and may determine the threshold number of overlapping PDCCH candidates is satisfied based thereon. In another example, the UE 115-*b* may determine a number of overlapping PDCCH candidate pairs. For example, there may be four overlapping PDCCH candidates, where there may be six pairs of overlapping PDCCH candidates. That is, four choose two is equal to six (e.g., $$\binom{4}{2} = 6).$$

As such, the UE 115-*b* may calculate the number of overlapping PDCCH candidates based on the number of overlapping PDCCH candidate pairs. In other words, the UE may count the number of overlapping PDCCH candidate pairs towards the total number of overlapping PDCCH candidates and determine that the threshold number of overlapping PDCCH candidates is satisfied.

In some examples, the UE 115-*b* may calculate the number of overlapping PDCCH candidates for respective CCs of a set of CCs, for the set of CCs, or a combination thereof, where the threshold number of overlapping PDCCH candidates may be for the respective CCs of the set of CCs, for the set of CCs, or a combination thereof. In some cases, at least one CC of the set of CCs may be a scheduling CC and the threshold number of overlapping PDCCH candidates associated with the scheduling CC may correspond to any, or all CCs scheduled by the scheduling CC. In any case, the UE 115-*b* may determine that the number of overlapping PDCCH candidates satisfies the threshold number of overlapping PDCCH candidates. That is, the number of overlapping PDCCH candidates may be less than or equal to the threshold number of overlapping PDCCH candidates. As such, at least one overlapping PDCCH candidates may be a PDCCH candidate that is excluded from a BD limit. Indeed, the UE 115-*b* may expect that the number of overlapping PDCCH candidates may be smaller than the threshold number of overlapping PDCCH candidates.

At 425, the UE 115-*b* may monitor the PDCCH for control information. The UE 115-*b* may monitor the PDCCH for control information based on (e.g., in accordance with) one or more PDCCH monitoring configurations as well as a number of overlapping PDCCH candidates. In some examples, the UE 115-*b* may determine that a first PDCCH candidate overlaps with a second PDCCH candidate based on the PDCCH monitoring configurations. In such examples, the threshold number of overlapping PDCCH candidates may be used for the first PDCCH candidate and the second PDCCH candidate. The UE 115-*b* may determine which PDCCH candidate may not be counted towards a BD limit based on the rules for counting overlapping PDCCH candidates as described with reference to FIGS. 2 and 3. For example, the first PDCCH candidate and the second PDCCH candidate may both be non-linked, independent PDCCH candidates. As such, the UE 115-*b* may determine to count the first PDCCH candidate or the second PDCCH candidate based on an search space set index (e.g., if the PDCCH candidates are in different search space sets) or based on a candidate index (e.g., if the PDCCH candidates are in the same search space set). In another example, the first PDCCH candidate may be a non-linked, independent PDCCH candidate and the second PDCCH candidate may be linked to a third PDCCH candidate different than the first PDCCH candidate and the second PDCCH candidate. As such, the UE 115-*b* may determine to refrain from counting the non-linked, individual PDCCH candidate, the PDCCH candidate associated with the higher search space set index, in some cases, comparing the minimum search space set index between the two linked PDCCH candidates as described with reference to FIG. 3. In yet another example, the first PDCCH candidate may be linked to a third PDCCH candidate and the second PDCCH candidate may be linked to a fourth PDCCH candidate and the UE 115-b may refrain from counting the first PDCCH candidate or the second PDCCH candidate toward a limit based on the previously described rules for counting overlapped PDCCH candidates.

Figure 5:
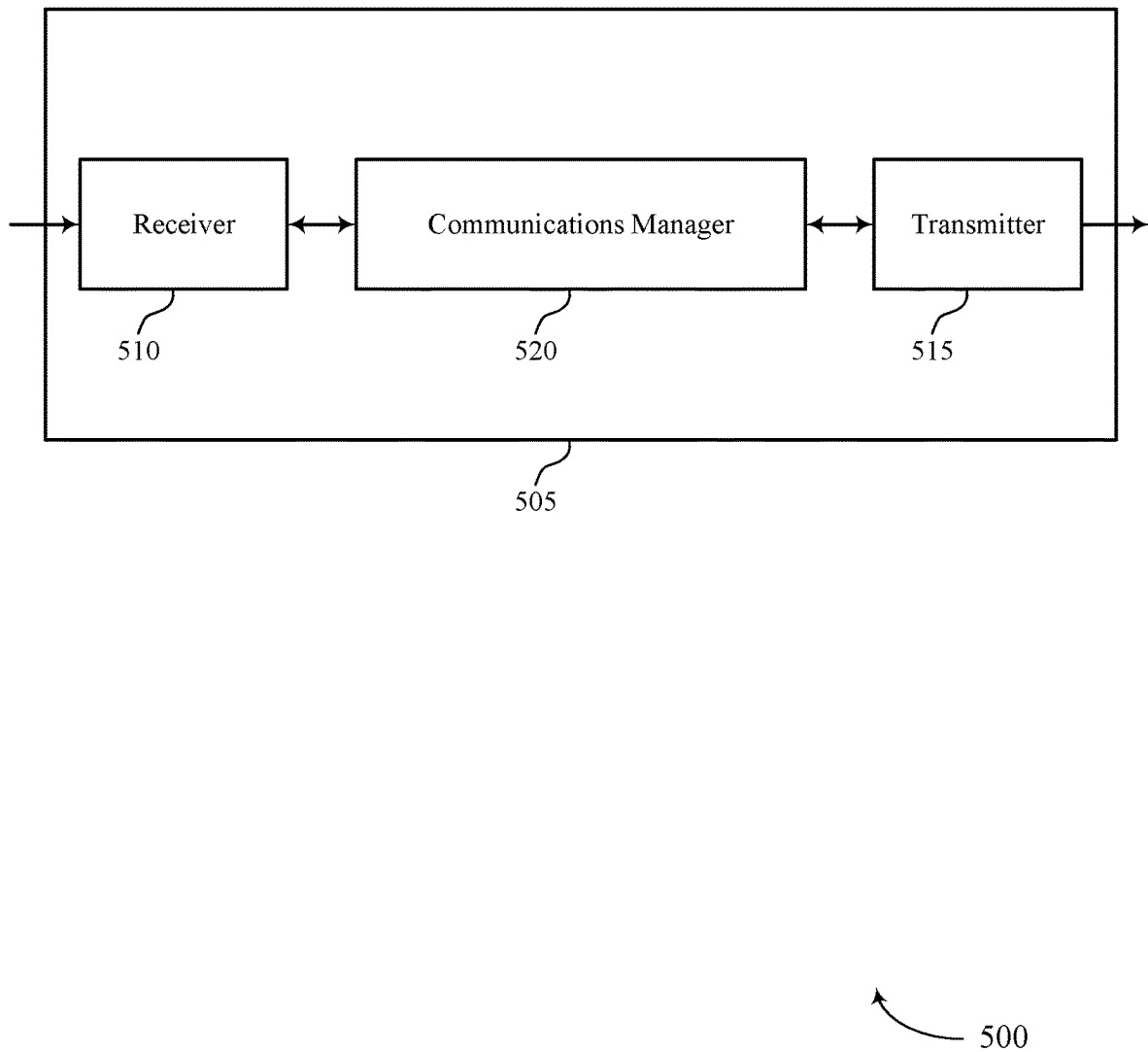
FIGS. 5 and 6 show block diagrams of devices that support overlapping PDCCH candidate thresholds in accordance with aspects of the present disclosure.

FIG. 5 shows a block diagram 500 of a device 505 that supports overlapping PDCCH candidate thresholds in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to overlapping PDCCH candidate thresholds). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to overlapping PDCCH candidate thresholds). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of overlapping PDCCH candidate thresholds as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for determining, for each SCS configuration of a set of one or more SCS configurations, a threshold number of overlapping PDCCH candidates within a time interval. The communications manager 520 may be configured as or otherwise support a means for receiving signaling indicating one or more PDCCH monitoring configurations. The communications manager 520 may be configured as or otherwise support a means for monitoring a PDCCH for control information based on the one or more PDCCH monitoring configurations and a number of overlapping PDCCH candidates satisfying the threshold number of overlapping PDCCH candidates.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for using a threshold number of overlapping PDCCH candidates, including cases where PDCCH repetition is used. As such, devices configured to monitor PDCCH according to the threshold number of overlapping PDCCH candidates may reduce an amount of redundant monitored control signaling, increasing the efficiency of communication resources, reducing system latency, and saving power at such devices.

Figure 6:
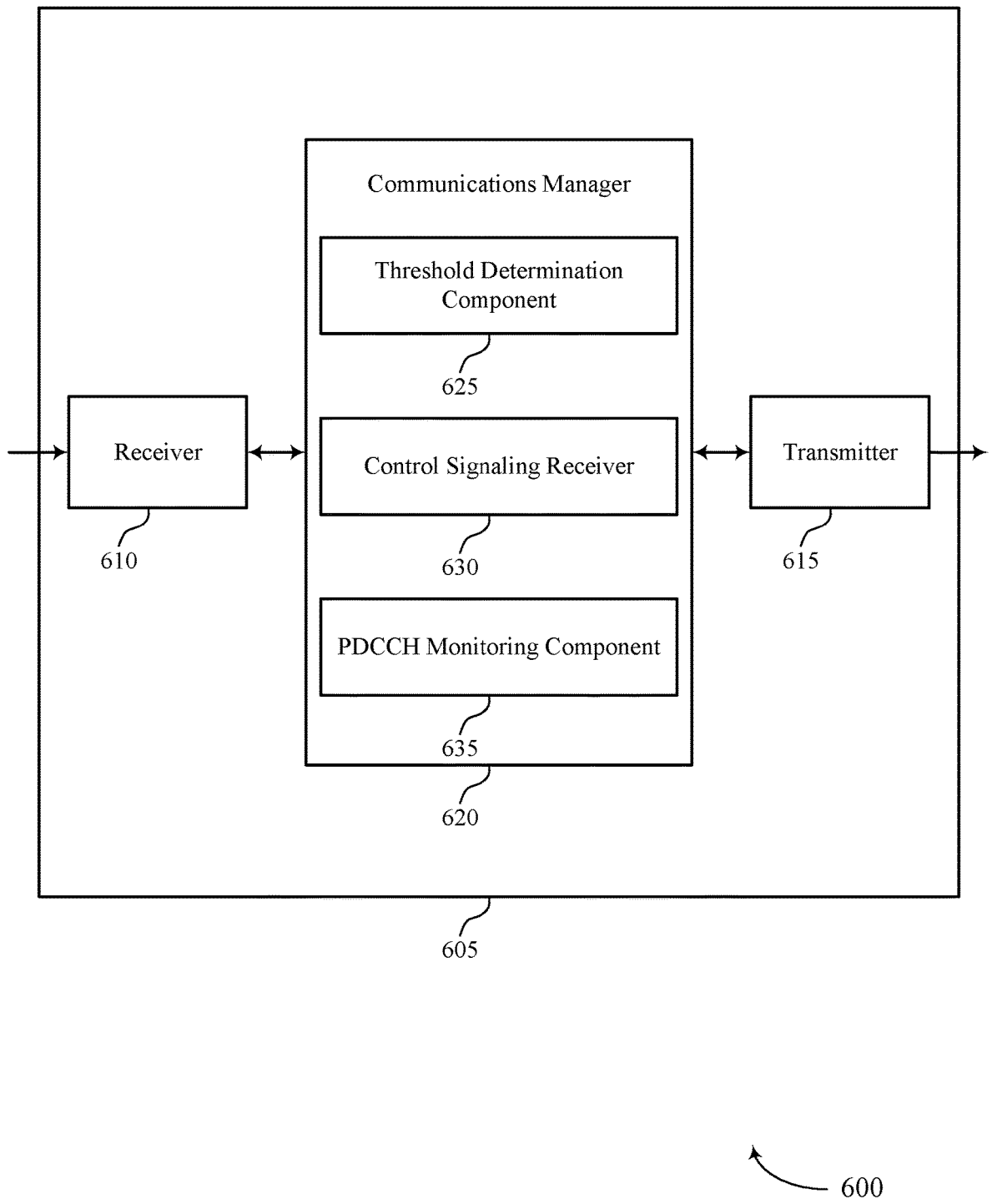

FIG. 6 shows a block diagram 600 of a device 605 that supports overlapping PDCCH candidate thresholds in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to overlapping PDCCH candidate thresholds). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to overlapping PDCCH candidate thresholds). In some examples, the transmitter 615 may be colocated with a receiver 610 in a transceiver module. The transmitter 615 may utilize a single antenna or a set of multiple antennas.

The device 605, or various components thereof, may be an example of means for performing various aspects of overlapping PDCCH candidate thresholds as described herein. For example, the communications manager 620 may include a threshold determination component 625, a control signaling receiver 630, a PDCCH monitoring component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The threshold determination component 625 may be configured as or otherwise support a means for determining, for each SCS configuration of a set of one or more SCS configurations, a threshold number of overlapping PDCCH candidates within a time interval. The control signaling receiver 630 may be configured as or otherwise support a means for receiving signaling indicating one or more PDCCH monitoring configurations. The PDCCH monitoring component 635 may be configured as or otherwise support a means for monitoring a PDCCH for control information based on the one or more PDCCH monitoring configurations and a number of overlapping PDCCH candidates satisfying the threshold number of overlapping PDCCH candidates.

Figure 7:
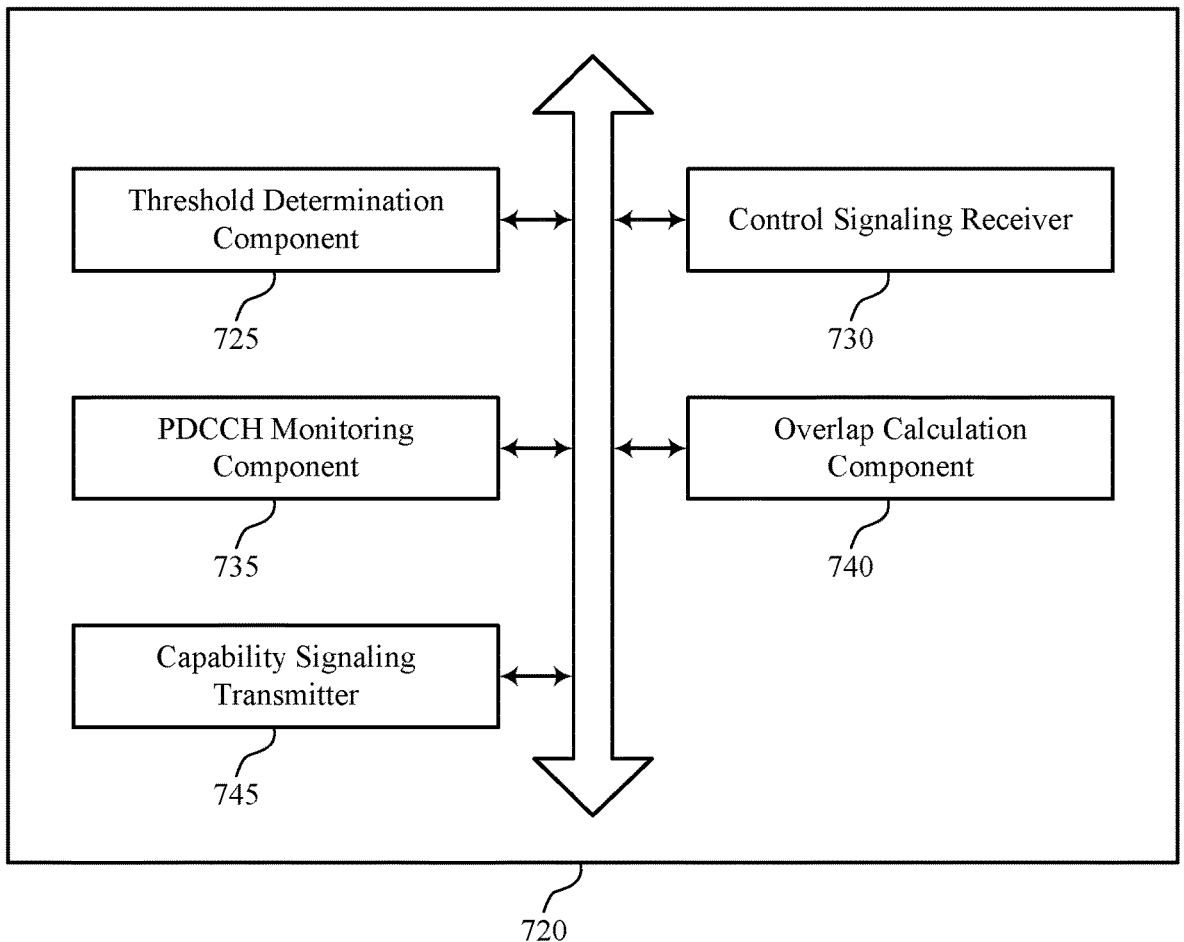
FIG. 7 shows a block diagram of a communications manager that supports overlapping PDCCH candidate thresholds in accordance with aspects of the present disclosure.

FIG. 7 shows a block diagram 700 of a communications manager 720 that supports overlapping PDCCH candidate thresholds in accordance with aspects of the present disclosure. The communications manager 720 may be an example of aspects of a communications manager 520, a communications manager 620, or both, as described herein. The communications manager 720, or various components thereof, may be an example of means for performing various aspects of overlapping PDCCH candidate thresholds as described herein. For example, the communications manager 720 may include a threshold determination component 725, a control signaling receiver 730, a PDCCH monitoring component 735, an overlap calculation component 740, a capability signaling transmitter 745, or any combination thereof. Each of these components may communicate, directly or indirectly, with one another (e.g., via one or more buses).

The communications manager 720 may support wireless communication at a UE in accordance with examples as disclosed herein. The threshold determination component 725 may be configured as or otherwise support a means for determining, for each SCS configuration of a set of one or more SCS configurations, a threshold number of overlapping PDCCH candidates within a time interval. The control signaling receiver 730 may be configured as or otherwise support a means for receiving signaling indicating one or more PDCCH monitoring configurations. The PDCCH monitoring component 735 may be configured as or otherwise support a means for monitoring a PDCCH for control information based on the one or more PDCCH monitoring configurations and a number of overlapping PDCCH candidates satisfying the threshold number of overlapping PDCCH candidates.

In some examples, the overlap calculation component 740 may be configured as or otherwise support a means for calculating the number of overlapping PDCCH candidates based on the one or more PDCCH monitoring configurations, where the number of overlapping PDCCH candidates is less than or equal to the threshold number of overlapping PDCCH candidates.

In some examples, to support calculating the number of overlapping PDCCH candidates, the overlap calculation component 740 may be configured as or otherwise support a means for determining a total number of overlapping control channel candidates within the time interval. In some examples, to support calculating the number of overlapping PDCCH candidates, the overlap calculation component 740 may be configured as or otherwise support a means for subtracting a quantity from the total number of overlapping control channel candidates, where the number of overlapping PDCCH candidates is determined based on a result of the subtracting.

In some examples, to support calculating the number of overlapping PDCCH candidates, the overlap calculation component 740 may be configured as or otherwise support a means for determining a number of overlapping PDCCH candidate pairs. In some examples, to support calculating the number of overlapping PDCCH candidates, the overlap calculation component 740 may be configured as or otherwise support a means for calculating the number of overlapping PDCCH candidates based on the number of overlapping PDCCH candidate pairs.

In some examples, to support determining the threshold number of overlapping PDCCH candidates, the threshold determination component 725 may be configured as or otherwise support a means for identifying the threshold number of overlapping PDCCH candidates from a set of predetermined PDCCH candidate thresholds.

In some examples, identifying the threshold number of overlapping PDCCH candidates from the set of predetermined PDCCH candidate thresholds is based on a SCS, the one or more PDCCH monitoring configurations, or any combination thereof.

In some examples, the capability signaling transmitter 745 may be configured as or otherwise support a means for transmitting capability signaling including an indication of the threshold number of overlapping PDCCH candidates. In some examples, the capability signaling is indicated per radio frequency band, per radio frequency band combination, or any combination thereof.

In some examples, the capability signaling includes the indication of the threshold number of overlapping PDCCH candidates per SCS configuration, per downlink control channel monitoring configurations, or any combination thereof.

In some examples, the capability signaling includes the indication of the threshold number of overlapping PDCCH candidates per slot, per span, or any combination thereof. In some examples, the capability signaling indicates that the UE supports PDCCH repetition.

In some examples, the overlap calculation component 740 may be configured as or otherwise support a means for calculating the number of overlapping PDCCH candidates for respective CCs of a set of one or more CCs, for the set of one or more CCs, or any combination thereof, where the threshold number of overlapping PDCCH candidates is for the respective CCs of the set of one or more CCs, for the set of one or more CCs, or any combination thereof.

In some examples, at least one CC of the set of one or more CCs includes a scheduling CC. In some examples, the threshold number of overlapping PDCCH candidates associated with the scheduling CC corresponds to a set of multiple CCs scheduled by the scheduling CC.

In some examples, to support determining the threshold number of overlapping PDCCH candidates, the threshold determination component 725 may be configured as or otherwise support a means for determining a first threshold number of overlapping PDCCH candidates for a first SCS configuration of the set of one or more SCS configurations. In some examples, to support determining the threshold number of overlapping PDCCH candidates, the threshold determination component 725 may be configured as or otherwise support a means for determining a second threshold number of overlapping PDCCH candidates for a second SCS configuration of the set of one or more SCS configurations, where the first threshold number of overlapping PDCCH candidates is different from the second threshold number of overlapping PDCCH candidates.

In some examples, the PDCCH monitoring component 735 may be configured as or otherwise support a means for determining that a first PDCCH candidate overlaps with a second PDCCH candidate based on the one or more PDCCH monitoring configurations, where the threshold number of overlapping PDCCH candidates is used for the first PDCCH candidate and the second PDCCH candidate.

In some examples, the first PDCCH candidate and the second PDCCH candidate each include a non-linked PDCCH candidate.

In some examples, the first PDCCH candidate includes a non-linked PDCCH candidate and the second PDCCH candidate includes a PDCCH candidate linked to a third PDCCH candidate different than the first PDCCH candidate and the second PDCCH candidate.

In some examples, the first PDCCH candidate includes a PDCCH candidate linked to a third PDCCH candidate and the second PDCCH candidate includes a PDCCH candidate linked to a fourth PDCCH candidate.

In some examples, at least one overlapping PDCCH candidate includes a PDCCH candidate that is excluded from a blind decoding limit.

In some examples, each overlapping PDCCH candidate is associated with a same set of time frequency resources, a same control resource set, a same scrambling sequence, a same DCI size, and a same carrier indicator field.

In some examples, the time interval includes a slot, a span, or a PDCCH monitoring occasion, or any combination thereof.

Figure 8:
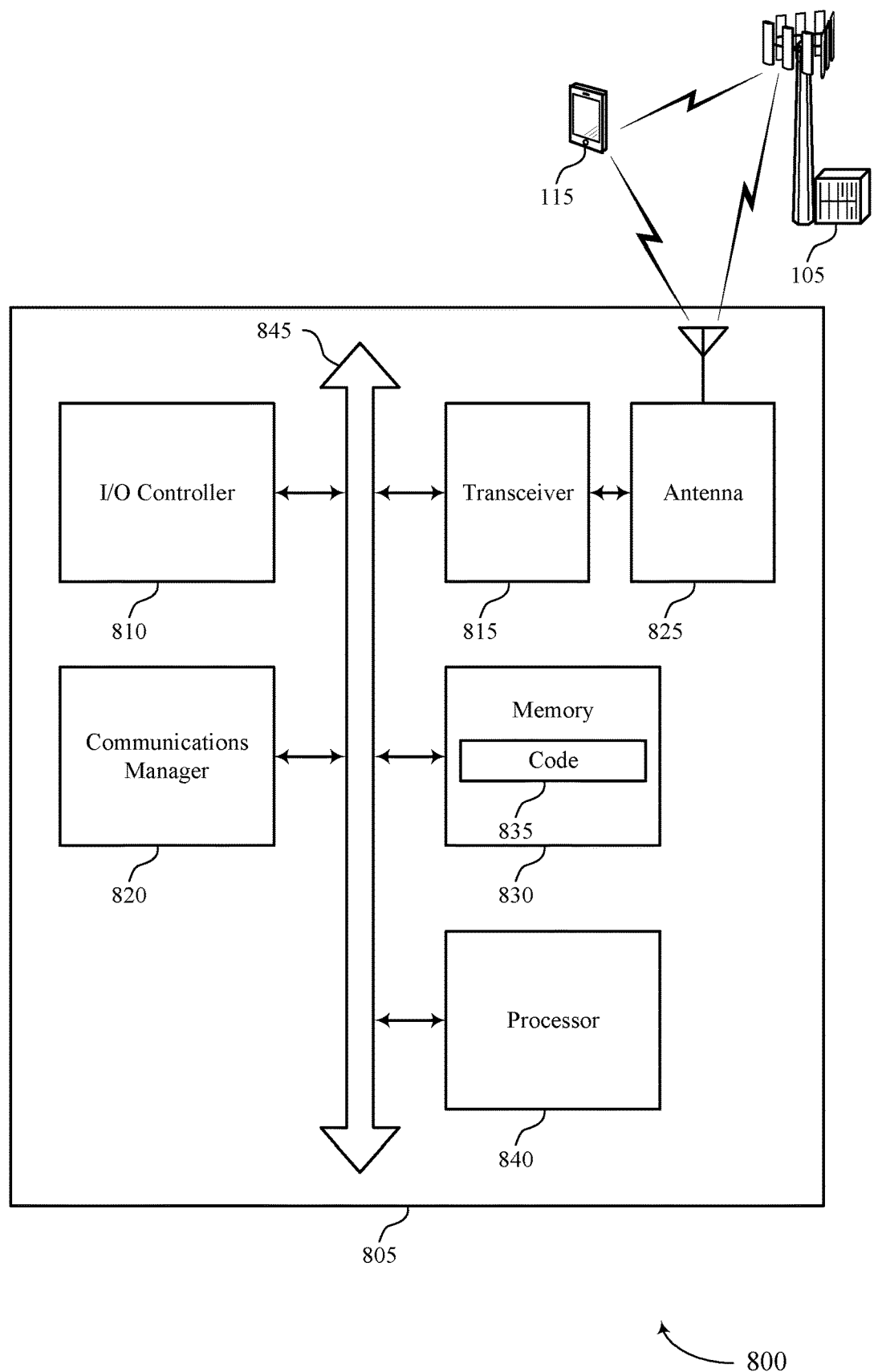
FIG. 8 shows a diagram of a system including a device that supports overlapping PDCCH candidate thresholds in accordance with aspects of the present disclosure.

FIG. 8 shows a diagram of a system 800 including a device 805 that supports overlapping PDCCH candidate thresholds in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting overlapping PDCCH candidate thresholds). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for determining, for each SCS configuration of a set of one or more SCS configurations, a threshold number of overlapping PDCCH candidates within a time interval. The communications manager 820 may be configured as or otherwise support a means for receiving signaling indicating one or more PDCCH monitoring configurations. The communications manager 820 may be configured as or otherwise support a means for monitoring a PDCCH for control information based on the one or more PDCCH monitoring configurations and a number of overlapping PDCCH candidates satisfying the threshold number of overlapping PDCCH candidates.

By including or configuring the communications manager 820 in accordance with examples as described herein, the device 805 may support techniques for using a threshold number of overlapping PDCCH candidates, including cases where PDCCH repetition is used. As such, devices configured to monitor PDCCH according to the threshold number of overlapping PDCCH candidates may reduce an amount of redundant monitored control signaling, resulting in reduced latency, more efficient utilization of communication resources, improved coordination between devices, and longer battery life.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of overlapping PDCCH candidate thresholds as described herein, or the processor 840 and the memory 830 may be otherwise configured to perform or support such operations.

Figure 9:
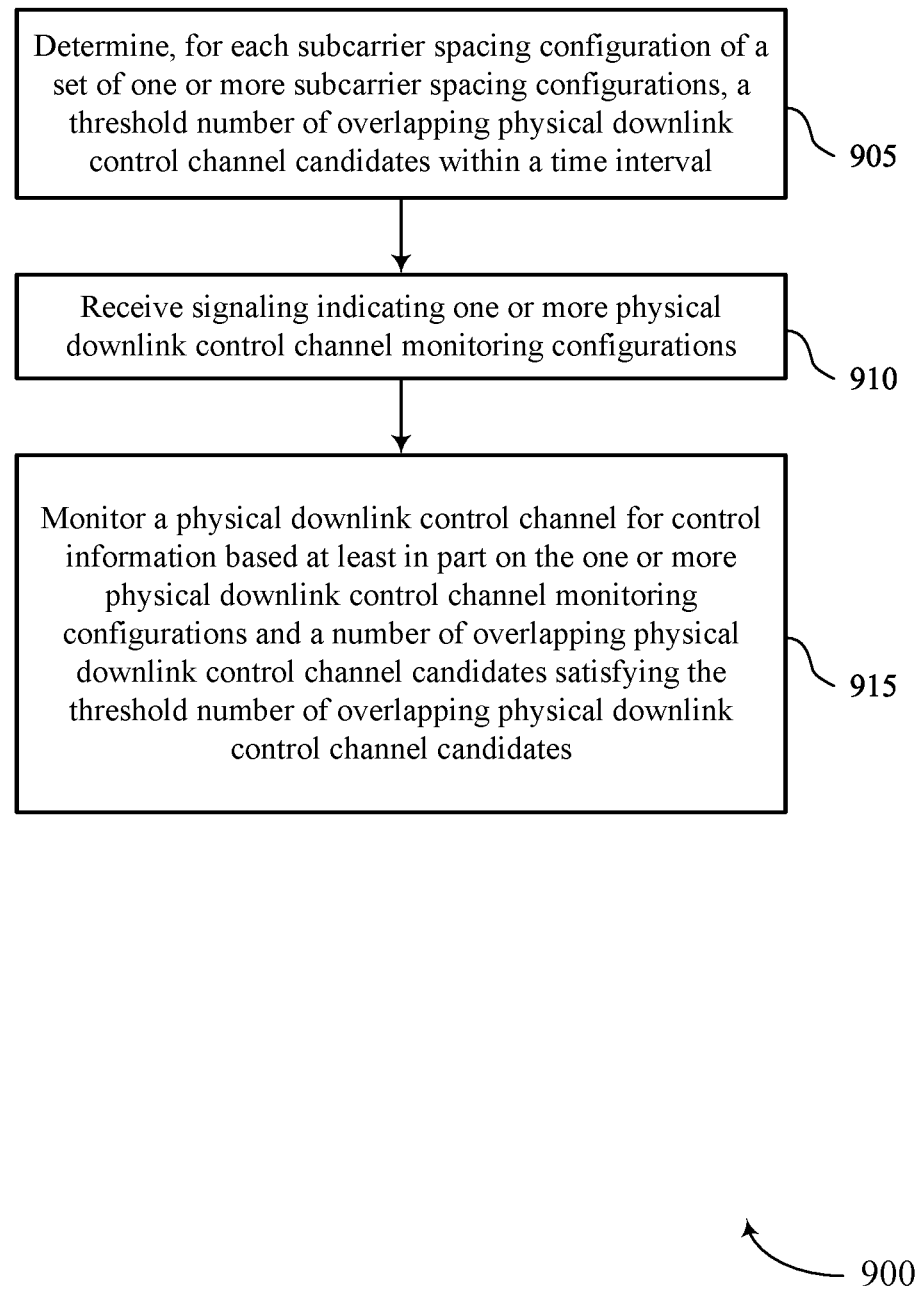
FIGS. 9 through 12 show flowcharts illustrating methods that support overlapping PDCCH candidate thresholds in accordance with aspects of the present disclosure.

FIG. 9 shows a flowchart illustrating a method 900 that supports overlapping PDCCH candidate thresholds in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include determining, for each SCS configuration of a set of one or more SCS configurations, a threshold number of overlapping PDCCH candidates within a time interval. The operations of 905 may be performed in accordance with examples as disclosed herein. In some examples, aspects of the operations of 905 may be performed by a threshold determination component 725 as described with reference to FIG. 7.

At 910, the method may include receiving signaling indicating one or more PDCCH monitoring configurations. The operations of 910 may be performed in accordance with examples as disclosed herein. In some examples, aspects of the operations of 910 may be performed by a control signaling receiver 730 as described with reference to FIG. 7.

At 915, the method may include monitoring a PDCCH for control information based on the one or more PDCCH monitoring configurations and a number of overlapping PDCCH candidates satisfying the threshold number of overlapping PDCCH candidates. The operations of 915 may be performed in accordance with examples as disclosed herein. In some examples, aspects of the operations of 915 may be performed by a PDCCH monitoring component 735 as described with reference to FIG. 7.

Figure 10:
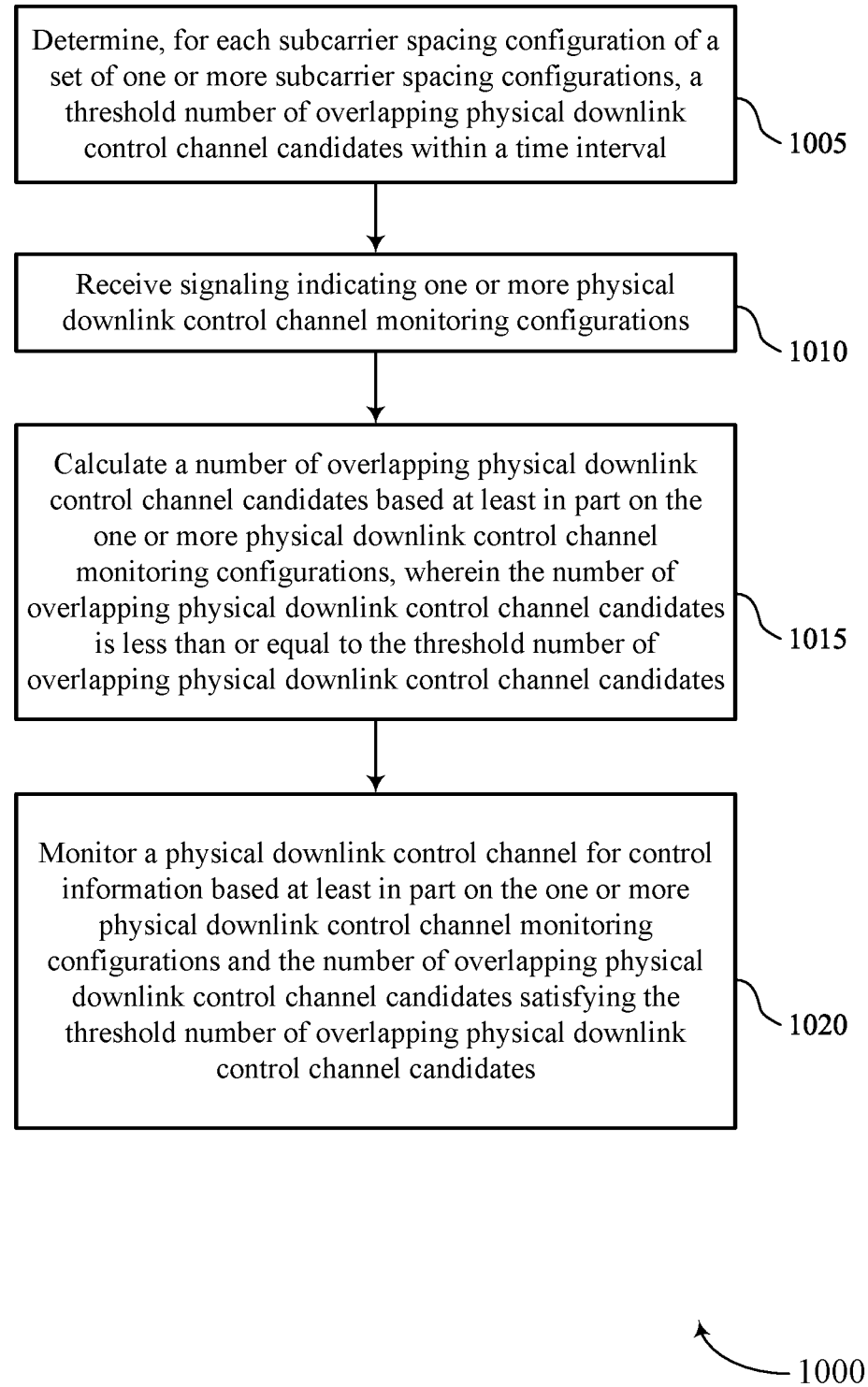

FIG. 10 shows a flowchart illustrating a method 1000 that supports overlapping PDCCH candidate thresholds in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include determining, for each SCS configuration of a set of one or more SCS configurations, a threshold number of overlapping PDCCH candidates within a time interval. The operations of 1005 may be performed in accordance with examples as disclosed herein. In some examples, aspects of the operations of 1005 may be performed by a threshold determination component 725 as described with reference to FIG. 7.

At 1010, the method may include receiving signaling indicating one or more PDCCH monitoring configurations. The operations of 1010 may be performed in accordance with examples as disclosed herein. In some examples, aspects of the operations of 1010 may be performed by a control signaling receiver 730 as described with reference to FIG. 7.

At 1015, the method may include calculating a number of overlapping PDCCH candidates based on the one or more PDCCH monitoring configurations, where the number of overlapping PDCCH candidates is less than or equal to the threshold number of overlapping PDCCH candidates. The operations of 1015 may be performed in accordance with examples as disclosed herein. In some examples, aspects of the operations of 1015 may be performed by an overlap calculation component 740 as described with reference to FIG. 7.

At 1020, the method may include monitoring a PDCCH for control information based on the one or more PDCCH monitoring configurations and the number of overlapping PDCCH candidates satisfying the threshold number of overlapping PDCCH candidates. The operations of 1020 may be performed in accordance with examples as disclosed herein. In some examples, aspects of the operations of 1020 may be performed by a PDCCH monitoring component 735 as described with reference to FIG. 7.

Figure 11:
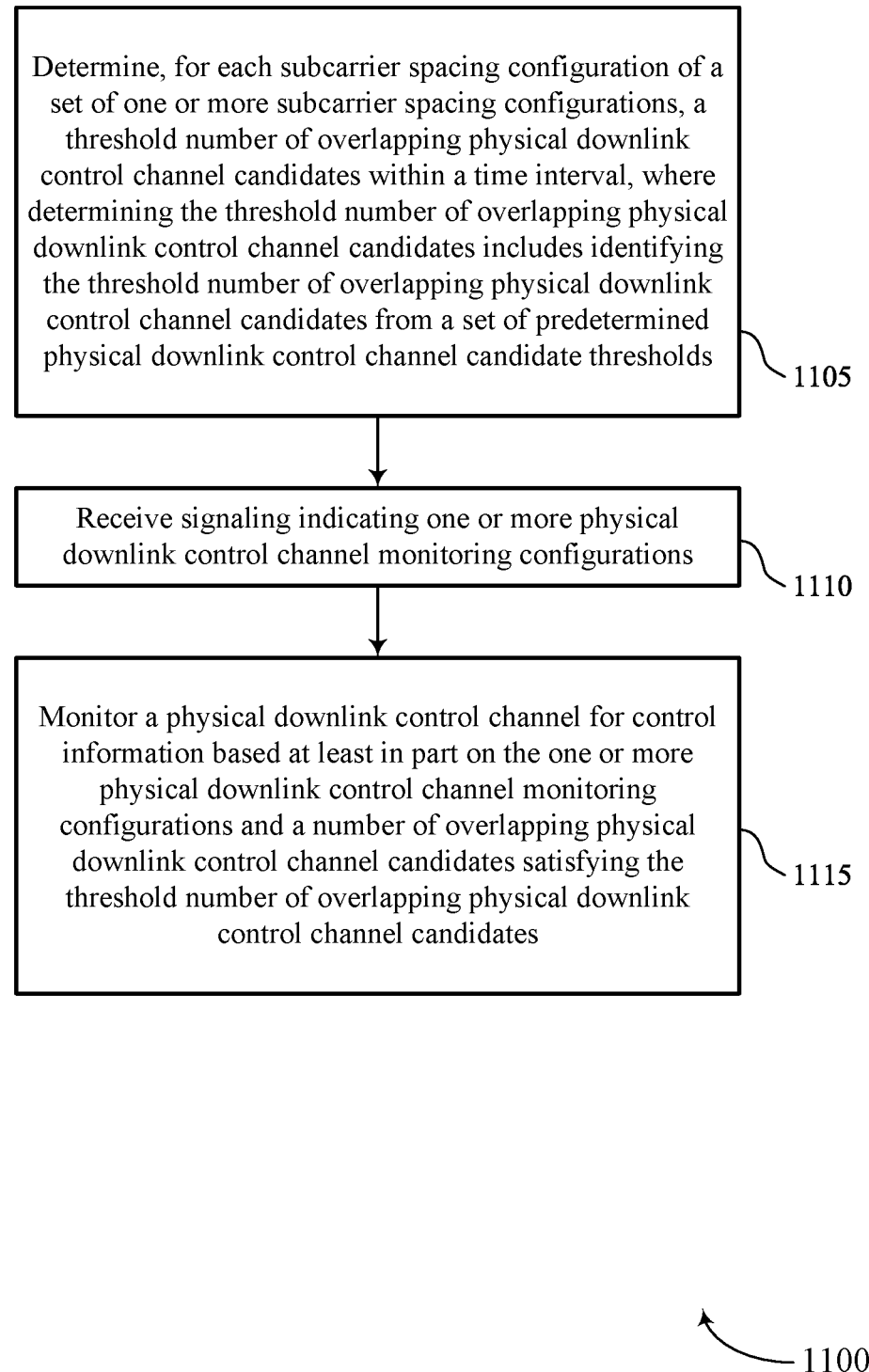

FIG. 11 shows a flowchart illustrating a method 1100 that supports overlapping PDCCH candidate thresholds in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include determining, for each SCS configuration of a set of one or more SCS configurations, a threshold number of overlapping PDCCH candidates within a time interval, where determining the threshold number of overlapping PDCCH candidates may include identifying the threshold number of overlapping PDCCH candidates from a set of predetermined PDCCH candidate thresholds. The operations of 1105 may be performed in accordance with examples as disclosed herein. In some examples, aspects of the operations of 1105 may be performed by a threshold determination component 725 as described with reference to FIG. 7.

At 1110, the method may include receiving signaling indicating one or more PDCCH monitoring configurations. The operations of 1110 may be performed in accordance with examples as disclosed herein. In some examples, aspects of the operations of 1110 may be performed by a control signaling receiver 730 as described with reference to FIG. 7.

At 1115, the method may include monitoring a PDCCH for control information based on the one or more PDCCH monitoring configurations and a number of overlapping PDCCH candidates satisfying the threshold number of overlapping PDCCH candidates. The operations of 1115 may be performed in accordance with examples as disclosed herein. In some examples, aspects of the operations of 1115 may be performed by a PDCCH monitoring component 735 as described with reference to FIG. 7.

Figure 12:
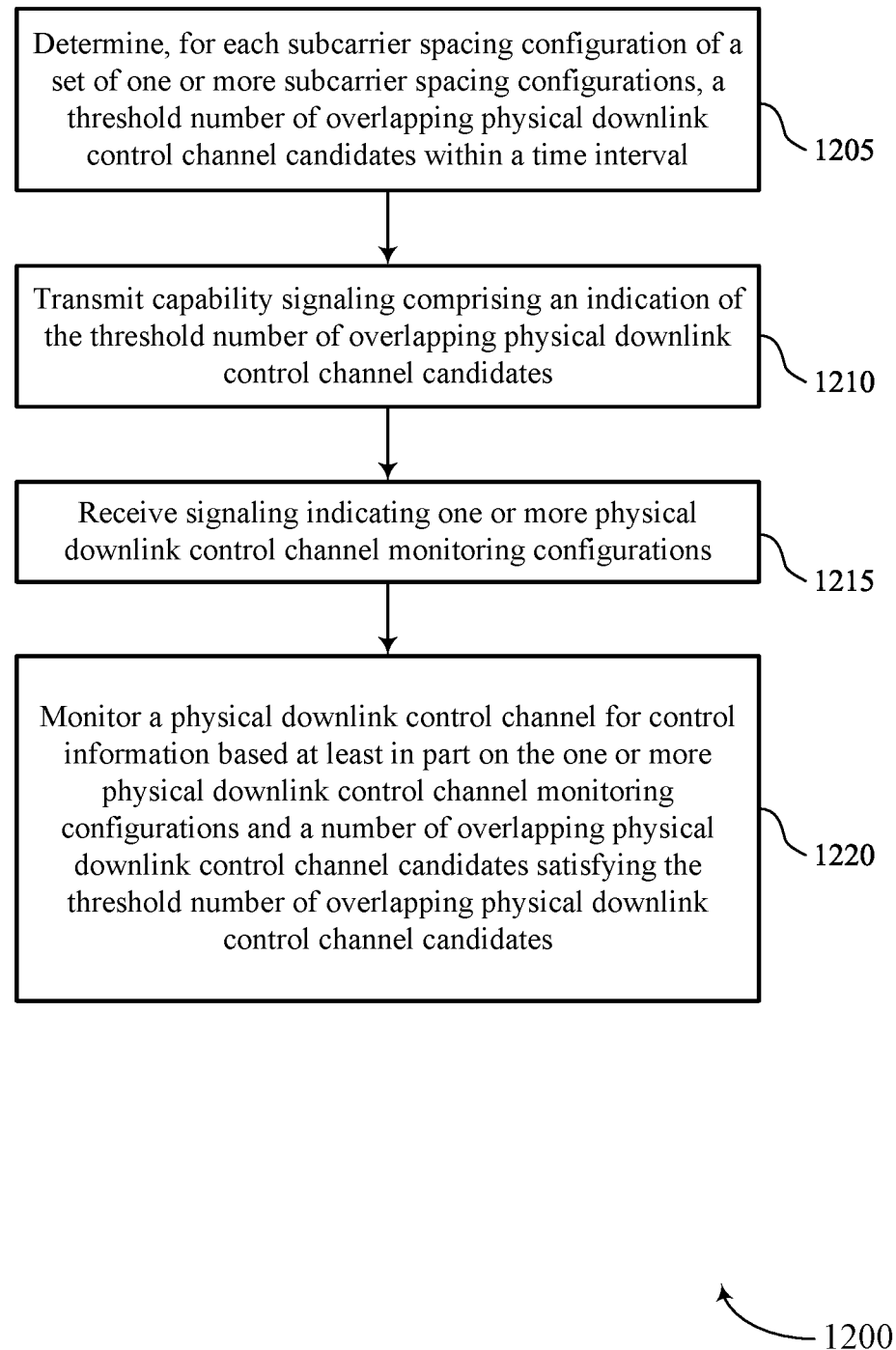

FIG. 12 shows a flowchart illustrating a method 1200 that supports overlapping PDCCH candidate thresholds in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include determining, for each SCS configuration of a set of one or more SCS configurations, a threshold number of overlapping PDCCH candidates within a time interval. The operations of 1205 may be performed in accordance with examples as disclosed herein. In some examples, aspects of the operations of 1205 may be performed by a threshold determination component 725 as described with reference to FIG. 7.

At 1210, the method may include transmitting capability signaling including an indication of the threshold number of overlapping PDCCH candidates. The operations of 1210 may be performed in accordance with examples as disclosed herein. In some examples, aspects of the operations of 1210 may be performed by a capability signaling transmitter 745 as described with reference to FIG. 7.

At 1215, the method may include receiving signaling indicating one or more PDCCH monitoring configurations. The operations of 1215 may be performed in accordance with examples as disclosed herein. In some examples, aspects of the operations of 1215 may be performed by a control signaling receiver 730 as described with reference to FIG. 7.

At 1220, the method may include monitoring a PDCCH for control information based on the one or more PDCCH monitoring configurations and a number of overlapping PDCCH candidates satisfying the threshold number of overlapping PDCCH candidates. The operations of 1220 may be performed in accordance with examples as disclosed herein. In some examples, aspects of the operations of 1220 may be performed by a PDCCH monitoring component 735 as described with reference to FIG. 7.

The following provides an overview of aspects of the present disclosure:

Aspect 1: A method for wireless communication at a UE, comprising: determining, for each subcarrier spacing configuration of a set of one or more subcarrier spacing configurations, a threshold number of overlapping physical downlink control channel candidates within a time interval; receiving signaling indicating one or more physical downlink control channel monitoring configurations; and monitoring a physical downlink control channel for control information based at least in part on the one or more physical downlink control channel monitoring configurations and a number of overlapping physical downlink control channel candidates satisfying the threshold number of overlapping physical downlink control channel candidates.

Aspect 2: The method of aspect 1, further comprising: calculating the number of overlapping physical downlink control channel candidates based at least in part on the one or more physical downlink control channel monitoring configurations, wherein the number of overlapping physical downlink control channel candidates is less than or equal to the threshold number of overlapping physical downlink control channel candidates.

Aspect 3: The method of aspect 2, wherein calculating the number of overlapping physical downlink control channel candidates comprises: determining a total number of overlapping control channel candidates within the time interval; and subtracting a quantity from the total number of overlapping control channel candidates, wherein the number of overlapping physical downlink control channel candidates is determined based at least in part on a result of the subtracting.

Aspect 4: The method of aspect 2, wherein calculating the number of overlapping physical downlink control channel candidates comprises: determining a number of overlapping physical downlink control channel candidate pairs; and calculating the number of overlapping physical downlink control channel candidates based at least in part on the number of overlapping physical downlink control channel candidate pairs.

Aspect 5: The method of any of aspects 1 through 4, wherein determining the threshold number of overlapping physical downlink control channel candidates comprises: identifying the threshold number of overlapping physical downlink control channel candidates from a set of predetermined physical downlink control channel candidate thresholds.

Aspect 6: The method of aspect 5, wherein identifying the threshold number of overlapping physical downlink control channel candidates from the set of predetermined physical downlink control channel candidate thresholds is based at least in part on a subcarrier spacing, the one or more physical downlink control channel monitoring configurations, or any combination thereof.

Aspect 7: The method of any of aspects 1 through 6, further comprising: transmitting capability signaling comprising an indication of the threshold number of overlapping physical downlink control channel candidates.

Aspect 8: The method of aspect 7, wherein the capability signaling is indicated per radio frequency band, per radio frequency band combination, or any combination thereof.

Aspect 9: The method of any of aspects 7 through 8, wherein the capability signaling comprises the indication of the threshold number of overlapping physical downlink control channel candidates per subcarrier spacing configuration, per downlink control channel monitoring configurations, or any combination thereof.

Aspect 10: The method of any of aspects 7 through 9, wherein the capability signaling comprises the indication of the threshold number of overlapping physical downlink control channel candidates per slot, per span, or any combination thereof.

Aspect 11: The method of any of aspects 7 through 10, wherein the capability signaling indicates that the UE supports physical downlink control channel repetition.

Aspect 12: The method of any of aspects 1 through 11, further comprising: calculating the number of overlapping physical downlink control channel candidates for respective component carriers of a set of one or more component carriers, for the set of one or more component carriers, or any combination thereof, wherein the threshold number of overlapping physical downlink control channel candidates is for the respective component carriers of the set of one or more component carriers, for the set of one or more component carriers, or any combination thereof.

Aspect 13: The method of aspect 12, wherein at least one component carrier of the set of one or more component carriers comprises a scheduling component carrier, and the threshold number of overlapping physical downlink control channel candidates associated with the scheduling component carrier corresponds to a plurality of component carriers scheduled by the scheduling component carrier.

Aspect 14: The method of any of aspects 1 through 13, wherein determining the threshold number of overlapping physical downlink control channel candidates comprises: determining a first threshold number of overlapping physical downlink control channel candidates for a first subcarrier spacing configuration of the set of one or more subcarrier spacing configurations; and determining a second threshold number of overlapping physical downlink control channel candidates for a second subcarrier spacing configuration of the set of one or more subcarrier spacing configurations, wherein the first threshold number of overlapping physical downlink control channel candidates is different from the second threshold number of overlapping physical downlink control channel candidates.

Aspect 15: The method of any of aspects 1 through 14, further comprising: determining that a first physical downlink control channel candidate overlaps with a second physical downlink control channel candidate based at least in part on the one or more physical downlink control channel monitoring configurations, wherein the threshold number of overlapping physical downlink control channel candidates is used for the first physical downlink control channel candidate and the second physical downlink control channel candidate.

Aspect 16: The method of aspect 15, wherein the first physical downlink control channel candidate and the second physical downlink control channel candidate each comprise a non-linked physical downlink control channel candidate.

Aspect 17: The method of aspect 15, wherein the first physical downlink control channel candidate comprises a non-linked physical downlink control channel candidate and the second physical downlink control channel candidate comprises a physical downlink control channel candidate linked to a third physical downlink control channel candidate different than the first physical downlink control channel candidate and the second physical downlink control channel candidate.

Aspect 18: The method of aspect 15, wherein the first physical downlink control channel candidate comprises a physical downlink control channel candidate linked to a third physical downlink control channel candidate and the second physical downlink control channel candidate comprises a physical downlink control channel candidate linked to a fourth physical downlink control channel candidate.

Aspect 19: The method of any of aspects 1 through 18, wherein at least one overlapping physical downlink control channel candidate comprises a physical downlink control channel candidate that is excluded from a blind decoding limit.

Aspect 20: The method of any of aspects 1 through 19, wherein each overlapping physical downlink control channel candidate is associated with a same set of time frequency resources, a same control resource set, a same scrambling sequence, a same DCI size, and a same carrier indicator field.

Aspect 21: The method of any of aspects 1 through 20, wherein the time interval comprises a slot, a span, or a physical downlink control channel monitoring occasion, or any combination thereof.

Aspect 22: An apparatus for wireless communication at a UE, comprising a processor; memory coupled with the processor; and instructions stored in the memory and executable by the processor to cause the apparatus to perform a method of any of aspects 1 through 21.

Aspect 23: An apparatus for wireless communication at a UE, comprising at least one means for performing a method of any of aspects 1 through 21.

Aspect 24: A non-transitory computer-readable medium storing code for wireless communication at a UE, the code comprising instructions executable by a processor to perform a method of any of aspects 1 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication, comprising:
a processor; and
memory coupled with the processor, wherein the processor is configured to:
determine a threshold number of overlapping physical downlink control channel candidates within a time interval and a threshold number of monitored physical downlink control channel candidates, the threshold number of monitored physical downlink control channel candidates being associated with a subcarrier spacing configuration of a set of one or more subcarrier spacing configurations, wherein the threshold number of overlapping physical downlink control channel candidates is a different threshold than the threshold number of monitored physical downlink control channel candidates;
receive signaling indicating one or more physical downlink control channel monitoring configurations; and
monitor a physical downlink control channel for control information based at least in part on the one or more physical downlink control channel monitoring configurations and a particular number of overlapping physical downlink control channel candidates satisfying the threshold number of overlapping physical downlink control channel candidates.

2. The apparatus of claim 1, wherein the processor is configured to:
calculate the particular number of overlapping physical downlink control channel candidates based at least in part on the one or more physical downlink control channel monitoring configurations, wherein the particular number of overlapping physical downlink control channel candidates is less than or equal to the threshold number of overlapping physical downlink control channel candidates.

3. The apparatus of claim 2, wherein, to calculate the particular number of overlapping physical downlink control channel candidates, the processor is configured to:
determine a total number of overlapping control channel candidates within the time interval; and
subtract a quantity from the total number of overlapping control channel candidates, wherein the particular number of overlapping physical downlink control channel candidates is based at least in part on a result of the subtraction.

4. The apparatus of claim 2, wherein, to calculate the particular number of overlapping physical downlink control channel candidates, the processor is configured to:
determine a number of overlapping physical downlink control channel candidate pairs; and
calculate the particular number of overlapping physical downlink control channel candidates based at least in part on the number of overlapping physical downlink control channel candidate pairs.

5. The apparatus of claim 1, wherein, to determine the threshold number of overlapping physical downlink control channel candidates, the processor is configured to:
identify the threshold number of overlapping physical downlink control channel candidates from a set of predetermined physical downlink control channel candidate thresholds.

6. The apparatus of claim 5, wherein identification of the threshold number of overlapping physical downlink control channel candidates from the set of predetermined physical downlink control channel candidate thresholds is based at least in part on a subcarrier spacing or the one or more physical downlink control channel monitoring configurations.

7. The apparatus of claim 1, wherein the processor is configured to:
transmit capability signaling comprising an indication of the threshold number of overlapping physical downlink control channel candidates.

8. The apparatus of claim 7, wherein the capability signaling is indicated per radio frequency band or per radio frequency band combination.

9. The apparatus of claim 7, wherein the capability signaling comprises the indication of the threshold number of overlapping physical downlink control channel candidates per subcarrier spacing configuration or per downlink control channel monitoring configurations.

10. The apparatus of claim 7, wherein the capability signaling comprises the indication of the threshold number of overlapping physical downlink control channel candidates per slot or per span.

11. The apparatus of claim 7, wherein the capability signaling indicates that the apparatus supports physical downlink control channel repetition.

12. The apparatus of claim 1, wherein the processor is configured to:
calculate the particular number of overlapping physical downlink control channel candidates for respective component carriers of a set of one or more component carriers or for the set of one or more component carriers, wherein the threshold number of overlapping physical downlink control channel candidates is for the respective component carriers of the set of one or more component carriers or for the set of one or more component carriers.

13. The apparatus of claim 12, wherein:
at least one component carrier of the set of one or more component carriers comprises a scheduling component carrier, and
the threshold number of overlapping physical downlink control channel candidates associated with the scheduling component carrier corresponds to a plurality of component carriers scheduled by the scheduling component carrier.

14. The apparatus of claim 1, wherein, to determine the threshold number of overlapping physical downlink control channel candidates, the processor is configured to:
determine a first threshold number of overlapping physical downlink control channel candidates for a first subcarrier spacing configuration of the set of one or more subcarrier spacing configurations; and
determine a second threshold number of overlapping physical downlink control channel candidates for a second subcarrier spacing configuration of the set of one or more subcarrier spacing configurations, wherein the first threshold number of overlapping physical downlink control channel candidates is different from the second threshold number of overlapping physical downlink control channel candidates.

15. The apparatus of claim 1, wherein the processor is configured to:
determine that a first physical downlink control channel candidate overlaps with a second physical downlink control channel candidate based at least in part on the one or more physical downlink control channel monitoring configurations, wherein the threshold number of overlapping physical downlink control channel candidates is used for the first physical downlink control channel candidate and the second physical downlink control channel candidate.

16. The apparatus of claim 15, wherein the first physical downlink control channel candidate and the second physical downlink control channel candidate each comprise a non-linked physical downlink control channel candidate.

17. The apparatus of claim 15, wherein the first physical downlink control channel candidate comprises a non-linked physical downlink control channel candidate and the second physical downlink control channel candidate comprises a physical downlink control channel candidate linked to a third physical downlink control channel candidate different than the first physical downlink control channel candidate and the second physical downlink control channel candidate.

18. The apparatus of claim 15, wherein the first physical downlink control channel candidate comprises a physical downlink control channel candidate linked to a third physical downlink control channel candidate and the second physical downlink control channel candidate comprises a physical downlink control channel candidate linked to a fourth physical downlink control channel candidate.

19. The apparatus of claim 1, wherein at least one overlapping physical downlink control channel candidate comprises a physical downlink control channel candidate that is excluded from a blind decoding limit.

20. The apparatus of claim 1, wherein each overlapping physical downlink control channel candidate is associated with a same set of time frequency resources, a same control resource set, a same scrambling sequence, a same DCI size, and a same carrier indicator field.

21. The apparatus of claim 1, wherein the time interval comprises a slot, a span, or a physical downlink control channel monitoring occasion.

22. The apparatus of claim 1, wherein the particular number of overlapping physical downlink control channel candidates is less than or equal to the threshold number of overlapping physical downlink control channel candidates.

23. The apparatus of claim 1, wherein the particular number of overlapping physical downlink control channel candidates is based at least in part on a number of overlapping physical downlink control channel candidate pairs.

24. The apparatus of claim 1, wherein the processor is configured to:
transmit capability signaling indicating the threshold number of overlapping physical downlink control channel candidates.

25. The apparatus of claim 24, wherein the capability signaling indicates that the apparatus supports physical downlink control channel repetition.

26. The apparatus of claim 1, wherein the time interval is a slot.

27. A method of wireless communication performed by an apparatus, comprising:
determining a threshold number of overlapping physical downlink control channel candidates within a time interval and a threshold number of monitored physical downlink control channel candidates, the threshold number of monitored physical downlink control channel candidates being associated with a subcarrier spacing configuration of a set of one or more subcarrier spacing configurations, wherein the threshold number of overlapping physical downlink control channel candidates is a different threshold than the threshold number of monitored physical downlink control channel candidates;
receiving signaling indicating one or more physical downlink control channel monitoring configurations; and
monitoring a physical downlink control channel for control information based at least in part on the one or more physical downlink control channel monitoring configurations and a particular number of overlapping physical downlink control channel candidates satisfying the threshold number of overlapping physical downlink control channel candidates.

28. The method of claim 27, further comprising:
calculating the particular number of overlapping physical downlink control channel candidates based at least in part on the one or more physical downlink control channel monitoring configurations, wherein the particular number of overlapping physical downlink control channel candidates is less than or equal to the threshold number of overlapping physical downlink control channel candidates.

29. The method of claim 27, wherein determining the threshold number of overlapping physical downlink control channel candidates comprises:
identifying the threshold number of overlapping physical downlink control channel candidates from a set of predetermined physical downlink control channel candidate thresholds.

30. The method of claim 29, wherein identifying the threshold number of overlapping physical downlink control channel candidates from the set of predetermined physical downlink control channel candidate thresholds is based at least in part on a subcarrier spacing or the one or more physical downlink control channel monitoring configurations.

31. The method of claim 27, further comprising:
transmitting capability signaling comprising an indication of the threshold number of overlapping physical downlink control channel candidates, wherein the capability signaling is indicated per radio frequency band or per radio frequency band combination, and wherein the capability signaling comprises the indication of the threshold number of overlapping physical downlink control channel candidates per subcarrier spacing configuration or per downlink control channel monitoring configurations.

32. The method of claim 27, further comprising:
calculating the particular number of overlapping physical downlink control channel candidates for respective component carriers of a set of one or more component carriers or for the set of one or more component carriers, wherein the threshold number of overlapping physical downlink control channel candidates is for the respective component carriers of the set of one or more component carriers or for the set of one or more component carriers.

33. The method of claim 27, wherein determining the threshold number of overlapping physical downlink control channel candidates comprises:
determining a first threshold number of overlapping physical downlink control channel candidates for a first subcarrier spacing configuration of the set of one or more subcarrier spacing configurations; and
determining a second threshold number of overlapping physical downlink control channel candidates for a second subcarrier spacing configuration of the set of one or more subcarrier spacing configurations, wherein the first threshold number of overlapping physical downlink control channel candidates is different from the second threshold number of overlapping physical downlink control channel candidates.

34. An apparatus for wireless communication, comprising:
means for determining a threshold number of overlapping physical downlink control channel candidates within a time interval and a threshold number of monitored physical downlink control channel candidates, the threshold number of monitored physical downlink control channel candidates being associated with a subcarrier spacing configuration of a set of one or more subcarrier spacing configurations, wherein the threshold number of overlapping physical downlink control channel candidates is a different threshold than the threshold number of monitored physical downlink control channel candidates;
means for receiving signaling indicating one or more physical downlink control channel monitoring configurations; and
means for monitoring a physical downlink control channel for control information based at least in part on the one or more physical downlink control channel monitoring configurations and a particular number of overlapping physical downlink control channel candidates satisfying the threshold number of overlapping physical downlink control channel candidates.

35. A non-transitory computer-readable medium having code stored thereon that, when executed by an apparatus, causes the apparatus to:
- determine a threshold number of overlapping physical downlink control channel candidates within a time interval and a threshold number of monitored physical downlink control channel candidates, the threshold number of monitored physical downlink control channel candidates being associated with a subcarrier spacing configuration of a set of one or more subcarrier spacing configurations, wherein the threshold number of overlapping physical downlink control channel candidates is a different threshold than the threshold number of monitored physical downlink control channel candidates;
- receive signaling indicating one or more physical downlink control channel monitoring configurations; and
- monitor a physical downlink control channel for control information based at least in part on the one or more physical downlink control channel monitoring configurations and a particular number of overlapping physical downlink control channel candidates satisfying the threshold number of overlapping physical downlink control channel candidates.

36. An apparatus for wireless communication, comprising:
- a processor; and
- memory coupled with the processor, wherein the processor is configured to:
  - determine a threshold number of overlapping physical downlink control channel candidates within a time interval and a threshold number of monitored physical downlink control channel candidates, the threshold number of monitored physical downlink control channel candidates being associated with a subcarrier spacing configuration, wherein the threshold number of overlapping physical downlink control channel candidates is a different threshold than the threshold number of monitored physical downlink control channel candidates;
  - receive signaling indicating one or more physical downlink control channel monitoring configurations; and
  - perform physical downlink control channel candidate monitoring based at least in part on the one or more physical downlink control channel monitoring configurations and a particular number of overlapping physical downlink control channel candidates satisfying the threshold number of overlapping physical downlink control channel candidates.

37. The apparatus of claim 36, wherein the particular number of overlapping physical downlink control channel candidates is less than or equal to the threshold number of overlapping physical downlink control channel candidates.

38. The apparatus of claim 36, wherein the particular number of overlapping physical downlink control channel candidates is based at least in part on a number of overlapping physical downlink control channel candidate pairs.

39. The apparatus of claim 36, wherein the processor is configured to:
- transmit capability signaling indicating the threshold number of overlapping physical downlink control channel candidates.

40. The apparatus of claim 39, wherein the capability signaling indicates that the apparatus supports physical downlink control channel repetition.

* * * * *